(12) United States Patent
Park et al.

(10) Patent No.: US 11,617,168 B2
(45) Date of Patent: Mar. 28, 2023

(54) TRANSMISSION CONFIGURATION INDICATOR STATE OPERATION FOR MULTI-POINT TRANSMISSION

(71) Applicant: QUALCOMM Incorporated, San Diego, CA (US)

(72) Inventors: Sungwoo Park, San Diego, CA (US); Wooseok Nam, San Diego, CA (US); Tao Luo, San Diego, CA (US); Kiran Venugopal, Raritan, NJ (US); Tianyang Bai, Bridgewater, NJ (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 16/987,000

(22) Filed: Aug. 6, 2020

(65) Prior Publication Data

US 2021/0120529 A1 Apr. 22, 2021

Related U.S. Application Data

(60) Provisional application No. 62/923,120, filed on Oct. 18, 2019.

(51) Int. Cl.
*H04W 72/04* (2009.01)
*H04L 5/00* (2006.01)
(Continued)

(52) U.S. Cl.
CPC .......... *H04W 72/042* (2013.01); *H04B 7/086* (2013.01); *H04L 5/0053* (2013.01); *H04L 5/0094* (2013.01); *H04W 72/0446* (2013.01)

(58) Field of Classification Search
CPC ..... H04L 5/0023; H04L 5/001; H04L 5/0092; H04L 5/0094; H04W 72/046; H04W 72/1263; H04W 72/0446; H04B 7/0695
See application file for complete search history.

(56) References Cited

U.S. PATENT DOCUMENTS

2018/0302889 A1\* 10/2018 Guo ..................... H04B 7/0617
2018/0343653 A1  11/2018 Guo
(Continued)

FOREIGN PATENT DOCUMENTS

WO   WO-2019153347 A1   8/2019

OTHER PUBLICATIONS

International Search Report and Written Opinion—PCT/US2020/051534—ISAEPO—dated Dec. 21, 2020 (200078WO).
(Continued)

*Primary Examiner* — Ayaz R Sheikh
*Assistant Examiner* — Debebe A Asefa
(74) *Attorney, Agent, or Firm* — Holland & Hart LLP

(57) ABSTRACT

Methods, systems, and devices for wireless communications are described. A base station may use beamforming to transmit control and data transmissions to a set of user equipments (UEs). A base station may transmit downlink control information (DCI) to UEs that may indicate a set of resource allocations in which the base station may schedule a data transmission, and a respective transmission configuration indicator (TCI) state. The TCI state may indicate which transmission beam the base station may use to transmit a data transmission in a particular resource allocation. The UE may receive and decode the DCI and identify resource allocation information and an index that may indicate one or more TCI states being used for transmitting a broadcast or unicast transmission to the UE within a resource allocation. The UE may select one or more of the resource allocations to monitor for, and subsequently receive, the data transmission.

30 Claims, 22 Drawing Sheets

(51) Int. Cl.
*H04B 7/08* (2006.01)
*H04W 72/0446* (2023.01)

(56) References Cited

U.S. PATENT DOCUMENTS

| | | | |
|---|---|---|---|
| 2019/0253220 A1* | 8/2019 | Kim | H04L 5/0053 |
| 2020/0221428 A1* | 7/2020 | Moon | H04B 7/024 |
| 2020/0337058 A1 | 10/2020 | Song et al. | |
| 2020/0344034 A1* | 10/2020 | Moon | H04L 5/0094 |

OTHER PUBLICATIONS

Spreadtrum Communications: "Discussion on Initial Access and Mobility in NR-U", 3GPP Draft, 3GPP TSG RAN WG1 Meeting #98bis, R1-1910015 Discussion on Initial Access and Mobility in NR-U_FINAL, 3rd Generation Partnership Project (3GPP), Mobile Competence Centre, 650, Route Des Lucioles, F-06921 Sophia-Antipolis, vol. RAN WG1, No. Chongqing, China, Oct. 14, 2019-Oct. 20, 2019, Oct. 3, 2019 (Oct. 3, 2019), XP051808046, 15 pages, Retrieved from the Internet: URL: https://ftp.3gpp.org/tsg_ran/WG1_RL1/TSGR1_98b/Docs/R1-1910015.zip R1-1910015_Discussion on Initial Access and Mobility in NR-U_final.docx, [retrieved on Oct. 3, 2019], Section 2.3.2, p. 10.

* cited by examiner

| | symbol, 555-a | | symbol, 555-b |
| | frequency band, 560-a | | frequency band, 565-a |
| | frequency band, 560-b | | frequency band, 565-b |
| | frequency band, 560-c | | frequency band, 565-c |
| | frequency band, 560-d | | frequency band, 565-d |

502

TRANSMISSION CONFIGURATION INDICATOR STATE OPERATION FOR MULTI-POINT TRANSMISSION

CROSS REFERENCE

The present Application for Patent claims the benefit of U.S. Provisional Patent Application No. 62/923,120 by PARK et al., entitled "TRANSMISSION CONFIGURATION INDICATOR STATE OPERATION FOR MULTI-POINT TRANSMISSION," filed Oct. 18, 2019, assigned to the assignee hereof, and expressly incorporated by reference herein.

FIELD OF TECHNOLOGY

The following relates generally to wireless communications and more specifically to transmission configuration indicator (TCI) state operation for multi-point transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some systems (e.g., systems operating in LTE) may support conventional broadcasting without beamforming such that a base station may omnidirectionally transmit data to UEs within a cell at the same time using the same transmission. Other systems, such as systems operating in mmW frequency ranges (e.g., 5G NR frequency range 2 (FR2) networks), may support beamforming such that a base station may steer signal energy in a particular direction to enhance reception by a receiving UE, and to reduce interference caused to other UEs located at different directions relative to the base station. As such, the approaches used to transmit control information and data to UEs may be different for conventional single-cell broadcast without beamforming and single-cell broadcast with beamforming.

SUMMARY

The described techniques relate to improved methods, systems, devices, and apparatuses that support TCI state operation for multi-point transmission. Generally, the described techniques provide for a base station to use beamforming to transmit a broadcast, multicast, or unicast transmission to a set of UEs in some systems (e.g., NR systems, NR FR2 systems). A base station may transmit a physical downlink control channel (PDCCH) transmission to one or more UEs that may include information such as downlink control information (DCI). The DCI may indicate a set of resource allocations (e.g., set of slots, symbol periods, frequency bands, frequency subbands) in which the base station may schedule a data transmission, and a respective TCI state that may be used by the base station for transmitting the data transmission in a respective one of the resource allocations. The TCI state may indicate which transmission beam the base station is using to transmit a data transmission in a particular resource allocation.

In some implementations, a base station may configure a UE with multiple active TCI state sets. A first active TCI state set may indicate active TCI states to be used for multicast or broadcast transmissions from the base station to a group of UEs. A second active TCI state set may indicate active TCI states to be used for unicast transmissions from the base station to a specific UE. The base station may indicate to the UE which active TCI state set to use based on how the DCI is scrambled (e.g., scrambled using a cell-radio network temporary identifier (C-RNTI) or group-RNTI (G-RNTI)).

The UE may receive the DCI and descramble the DCI, or descramble the cyclic redundancy check (CRC) bits of the DCI, or both, using an individual identifier of the UE (e.g., C-RNTI) or a group identifier (e.g., G-RNTI) to determine which TCI state set to use based on which identifier was used to successfully descramble the DCI. The UE may identify an index (e.g., a TCI codepoint) in the DCI that may indicate a particular active TCI state from the unicast or broadcast/multicast TCI state set that may be used for transmitting a unicast or broadcast/multicast transmission to the UE or UE group within a resource allocation. The UE may select one or more of the resource allocations to monitor for, and subsequently receive, the data transmission.

A method of wireless communications by a UE is described. The method may include receiving DCI that indicates a set of resource allocations within each of which a multi-point data transmission is scheduled for transmission and a respective TCI state from a set of TCI states assigned to each resource allocation of the set of resource allocations and monitoring a first resource allocation of the set of resource allocations for the multi-point data transmission using a receive beam corresponding to a first TCI state of the set of TCI states that is assigned to the first resource allocation.

An apparatus for wireless communications by a UE is described. The apparatus may include a processor, memory coupled with the processor, and instructions stored in the memory. The instructions may be executable by the processor to cause the apparatus to receive DCI that indicates a set of resource allocations within each of which a multi-point data transmission is scheduled for transmission and a respective TCI state from a set of TCI states assigned to each resource allocation of the set of resource allocations and monitor a first resource allocation of the set of resource allocations for the multi-point data transmission using a receive beam corresponding to a first TCI state of the set of TCI states that is assigned to the first resource allocation.

Another apparatus for wireless communications by a UE is described. The apparatus may include means for receiving DCI that indicates a set of resource allocations within each of which a multi-point data transmission is scheduled for transmission and a respective TCI state from a set of TCI states assigned to each resource allocation of the set of resource allocations and monitoring a first resource allocation of the set of resource allocations for the multi-point data transmission using a receive beam corresponding to a first TCI state of the set of TCI states that is assigned to the first resource allocation.

A non-transitory computer-readable medium storing code for wireless communications by a UE is described. The code may include instructions executable by a processor to receive DCI that indicates a set of resource allocations within each of which a multi-point data transmission is scheduled for transmission and a respective TCI state from a set of TCI states assigned to each resource allocation of the set of resource allocations and monitor a first resource allocation of the set of resource allocations for the multi-point data transmission using a receive beam corresponding to a first TCI state of the set of TCI states that is assigned to the first resource allocation.

In some examples of the method, apparatuses, and non-transitory computer-readable medium described herein, receiving the DCI may include operations, features, means, or instructions for receiving the DCI that may be scrambled with a group identifier of a group that includes the UE.

In some examples of the method, apparatuses, and non-transitory computer-readable medium described herein, receiving the DCI may include operations, features, means, or instructions for receiving the DCI that indicates the set of resource allocations may be a set of time domain multiplexed (TDM) resource allocations.

In some examples of the method, apparatuses, and non-transitory computer-readable medium described herein, receiving the DCI may include operations, features, means, or instructions for receiving the DCI that indicates the set of TDM resource allocations may be a set of slots or a set of symbol periods.

In some examples of the method, apparatuses, and non-transitory computer-readable medium described herein, receiving the DCI may include operations, features, means, or instructions for receiving the DCI that indicates the set of resource allocations may be a set of frequency division multiplexed (FDM) resource allocations.

Some examples of the method, apparatuses, and non-transitory computer-readable medium described herein may further include operations, features, means, or instructions for receiving control signaling that indicates a control channel TCI state for a first transmission beam having a first beam width that may be utilized to transmit the DCI within a control channel, where the DCI may be received within the control channel in accordance with the control channel TCI state.

In some examples of the method, apparatuses, and non-transitory computer-readable medium described herein, the first beam width of a control channel transmission beam indicated by the control channel TCI state may be different than a second beam width of a second transmission beam indicated by the first TCI state.

In some examples of the method, apparatuses, and non-transitory computer-readable medium described herein, the control channel TCI state corresponds to a first quasi co-location relationship with a first reference signal and the first TCI state corresponds to a second quasi co-location relationship with a second reference signal.

In some examples of the method, apparatuses, and non-transitory computer-readable medium described herein, the first quasi co-location relationship differs from the second quasi co-location relationship.

Some examples of the method, apparatuses, and non-transitory computer-readable medium described herein may further include operations, features, means, or instructions for receiving the multi-point data transmission using the receive beam.

In some examples of the method, apparatuses, and non-transitory computer-readable medium described herein, the multi-point data transmission may be a broadcast transmission or a multicast transmission.

Some examples of the method, apparatuses, and non-transitory computer-readable medium described herein may further include operations, features, means, or instructions for receiving control signaling that indicates a first active TCI state set for multi-point data transmissions and a second active TCI state set for unicast data transmissions.

Some examples of the method, apparatuses, and non-transitory computer-readable medium described herein may further include operations, features, means, or instructions for decoding the DCI that may be descrambled from a received bit sequence based on a group identifier assigned to a group that includes the UE, and selecting the first TCI state from the first active TCI state set based on indexing the first active TCI state set using an index derived from the DCI.

Some examples of the method, apparatuses, and non-transitory computer-readable medium described herein may further include operations, features, means, or instructions for decoding second DCI that may be descrambled from a received bit sequence based on a UE identifier of the UE, the second DCI indicating a second resource allocation for a unicast data transmission, selecting a second TCI state from the second active TCI state set based on indexing the second active TCI state set using an index derived from the second DCI, and monitoring the second resource allocation for the unicast data transmission using a second receive beam corresponding to the second TCI state.

In some examples of the method, apparatuses, and non-transitory computer-readable medium described herein, monitoring the second resource allocation may include operations, features, means, or instructions for receiving the unicast data transmission via the second resource allocation using the second receive beam.

In some examples of the method, apparatuses, and non-transitory computer-readable medium described herein, receiving the control signaling may include operations, features, means, or instructions for receiving at least one medium access control (MAC) control element that indicates the first active TCI state set, the second active TCI state set, or both.

A method of wireless communications by a base station is described. The method may include transmitting DCI that indicates a set of resource allocations within which a multi-point data transmission is scheduled for transmission and a respective TCI state from a set of TCI states assigned to each resource allocation of the set of resource allocations and transmitting the multi-point data transmission in each resource allocation of the set of resource allocations in accordance with a respective TCI state of the set of TCI states that is respectively assigned to the set of resource allocations.

An apparatus for wireless communications by a base station is described. The apparatus may include a processor, memory coupled with the processor, and instructions stored in the memory. The instructions may be executable by the processor to cause the apparatus to transmit DCI that indicates a set of resource allocations within which a multi-point data transmission is scheduled for transmission and a respective TCI state from a set of TCI states assigned to each resource allocation of the set of resource allocations and transmit the multi-point data transmission in each resource allocation of the set of resource allocations in accordance with a respective TCI state of the set of TCI states that is respectively assigned to the set of resource allocations.

Another apparatus for wireless communications by a base station is described. The apparatus may include means for transmitting DCI that indicates a set of resource allocations within which a multi-point data transmission is scheduled for transmission and a respective TCI state from a set of TCI states assigned to each resource allocation of the set of resource allocations and transmitting the multi-point data transmission in each resource allocation of the set of resource allocations in accordance with a respective TCI state of the set of TCI states that is respectively assigned to the set of resource allocations.

A non-transitory computer-readable medium storing code for wireless communications by a base station is described. The code may include instructions executable by a processor to transmit DCI that indicates a set of resource allocations within which a multi-point data transmission is scheduled for transmission and a respective TCI state from a set of TCI states assigned to each resource allocation of the set of resource allocations and transmit the multi-point data transmission in each resource allocation of the set of resource allocations in accordance with a respective TCI state of the set of TCI states that is respectively assigned to the set of resource allocations.

In some examples of the method, apparatuses, and non-transitory computer-readable medium described herein, transmitting the DCI may include operations, features, means, or instructions for transmitting the DCI that may be scrambled with a group identifier of a group of UEs.

In some examples of the method, apparatuses, and non-transitory computer-readable medium described herein, transmitting the DCI may include operations, features, means, or instructions for transmitting the DCI that indicates the set of resource allocations may be a set of TDM resource allocations.

In some examples of the method, apparatuses, and non-transitory computer-readable medium described herein, transmitting the DCI may include operations, features, means, or instructions for transmitting the DCI that indicates the set of TDM resource allocations may be a set of slots or a set of symbol periods.

In some examples of the method, apparatuses, and non-transitory computer-readable medium described herein, transmitting the DCI may include operations, features, means, or instructions for transmitting the DCI that indicates the set of resource allocations may be a set of FDM resource allocations.

Some examples of the method, apparatuses, and non-transitory computer-readable medium described herein may further include operations, features, means, or instructions for transmitting control signaling that indicates a control channel TCI state for a first transmission beam having a first beam width that may be utilized to transmit the DCI within a control channel, where the DCI may be transmitted within the control channel in accordance with the control channel TCI state.

In some examples of the method, apparatuses, and non-transitory computer-readable medium described herein, the first beam width of a control channel transmission beam indicated by the control channel TCI state may be wider than a second beam width of a second transmission beam indicated by a first TCI state of the plurality of transmission configuration indicator states.

In some examples of the method, apparatuses, and non-transitory computer-readable medium described herein, the control channel TCI state corresponds to a first quasi co-location relationship with a first reference signal and a first TCI state of the plurality of transmission configuration indicator states corresponds to a second quasi co-location relationship with a second reference signal.

In some examples of the method, apparatuses, and non-transitory computer-readable medium described herein, the first quasi co-location relationship differs from the second quasi co-location relationship.

In some examples of the method, apparatuses, and non-transitory computer-readable medium described herein, the multi-point data transmission may be a broadcast transmission or a multicast transmission.

Some examples of the method, apparatuses, and non-transitory computer-readable medium described herein may further include operations, features, means, or instructions for transmitting control signaling that indicates a first active TCI state set for multi-point data transmissions and a second active TCI state set for unicast data transmissions.

Some examples of the method, apparatuses, and non-transitory computer-readable medium described herein may further include operations, features, means, or instructions for transmitting second DCI indicating a second resource allocation for a unicast data transmission and an index to a second TCI state within the second active TCI state set, and transmitting the unicast data transmission via the second resource allocation in accordance with the second TCI state.

In some examples of the method, apparatuses, and non-transitory computer-readable medium described herein, transmitting the control signaling may include operations, features, means, or instructions for transmitting at least one MAC control element that indicates the first active TCI state set, the second active TCI state set, or both.

DETAILED DESCRIPTION

In LTE (or non-beamformed) wireless communications systems, a base station may omnidirectionally transmit the same data to a set of UEs (e.g., all UEs within a cell) at the same time. In some cases, a single PDCCH transmission may be used to schedule a single physical downlink shared channel (PDSCH) transmission to the set of UEs. In NR or other FR2 systems, a base station may use beamforming to transmit a transmission in a single direction or a few directions at a time, and less than all UEs being served by the base station may be able to receive the transmission at the same time. When using beamforming to broadcast data, the base station may transmit the same broadcast transmission multiple times to reach all UEs served by the base station (e.g., a single or multiple PDCCH transmission to schedule multiple PDSCH transmissions). As such, conventional single-cell broadcasting approaches used in LTE wireless communications systems may not be applied to NR FR2 systems where analog beamforming is used.

In accordance with the techniques described herein, to broadcast or multicast a data transmission in NR FR2 systems, a base station may transmit DCI in a single PDCCH to schedule a broadcast or multicast transmission (e.g., PDSCH) to a set of UEs and allocate multiple resource allocations. The DCI may indicate which of multiple beams (e.g., TCI states) may be used by the base station to transmit the broadcast or multicast transmission in a respective one of the resource allocations. A UE may monitor one or more of the resource allocations to receive a PDSCH on the one or more beams associated with the one or more resource allocations.

Particular aspects of the subject matter described herein may be implemented to realize one or more advantages. The described techniques may support improvements in the TCI operation for multi-point transmission, such as increased flexibility, among other advantages. As such, supported techniques may include improved network operations and, in some examples, may promote network efficiencies, among other benefits.

Aspects of the disclosure are initially described in the context of wireless communications systems. Aspects are then described with respect to an example resource allocation of a wireless communications system and a process flow. Aspects of the disclosure are further illustrated by and described with reference to apparatus diagrams, system diagrams, and flowcharts that relate to TCI state operation for multi-point transmission.

Figure 1:
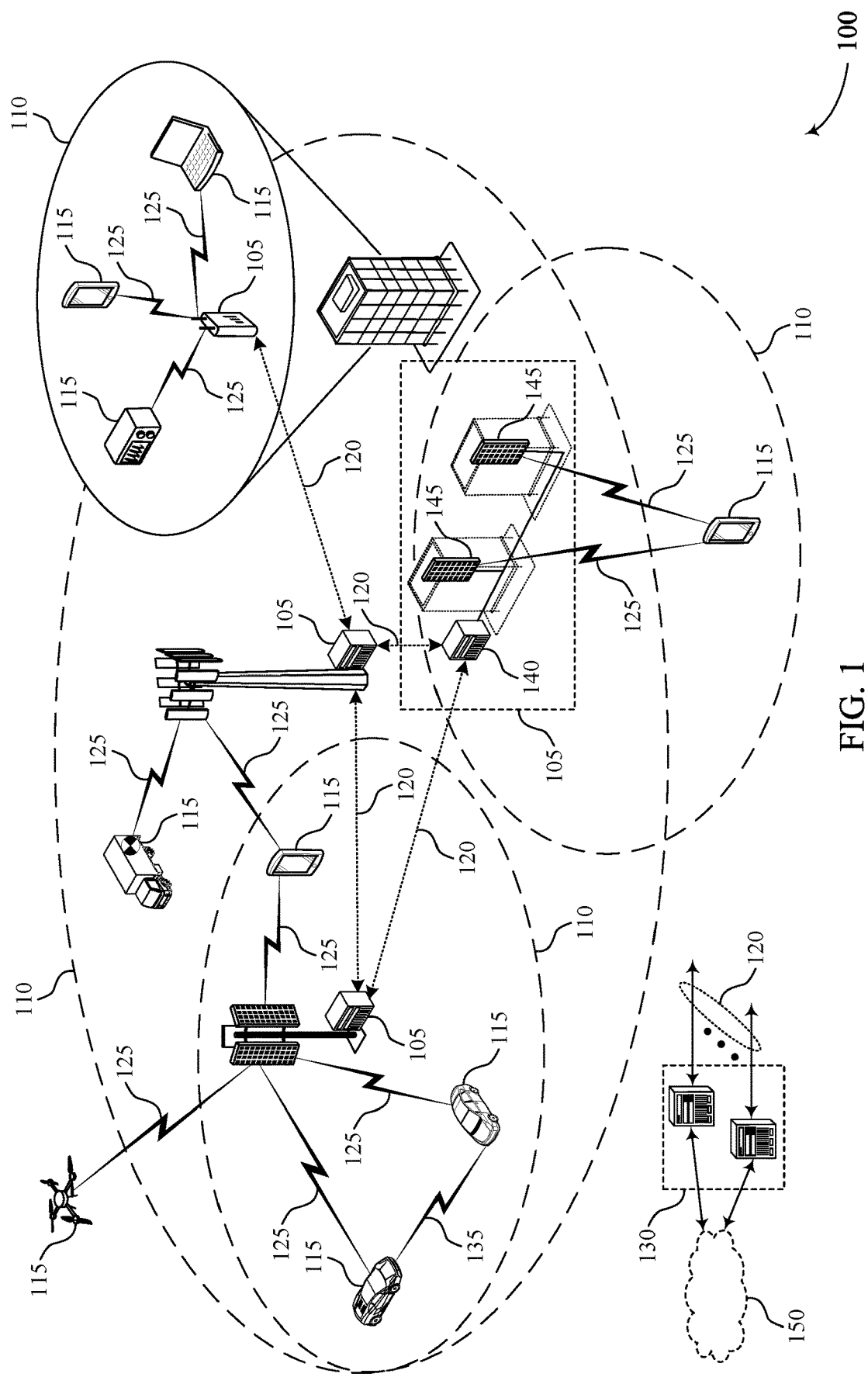
FIG. 1-4 illustrate examples of a system for wireless communications that support TCI state operation for multi-point transmission in accordance with aspects of the present disclosure.

FIG. 1 illustrates an example of a wireless communications system 100 that supports TCI state operation for multi-point transmission in accordance with aspects of the present disclosure. The wireless communications system 100 may include one or more base stations 105, one or more UEs 115, and a core network 130. In some examples, the wireless communications system 100 may be a LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 may use beamforming to transmit a broadcast or unicast transmission to a set of UEs 115. A base station 105 may transmit a PDCCH that may include DCI to one or more UEs 115. The DCI may indicate a set of resource allocations in which the base station 105 may schedule a data transmission, and a respective TCI state (e.g., indicated as a TCI state index) the base station 105 may use for transmitting the data transmission in a respective one of the resource allocations. For example, the TCI state may indicate which transmission beam the base station 105 may use to transmit a data transmission in a particular resource allocation. The UE 115 may receive the DCI and identify an index in the decoded DCI that may indicate one or more TCI states being used for transmitting a broadcast or multicast transmission to the UE 115 within a resource allocation. The UE 115 may select one or more of the resource allocations to monitor for, and subsequently receive, the data transmission.

Figure 2A:
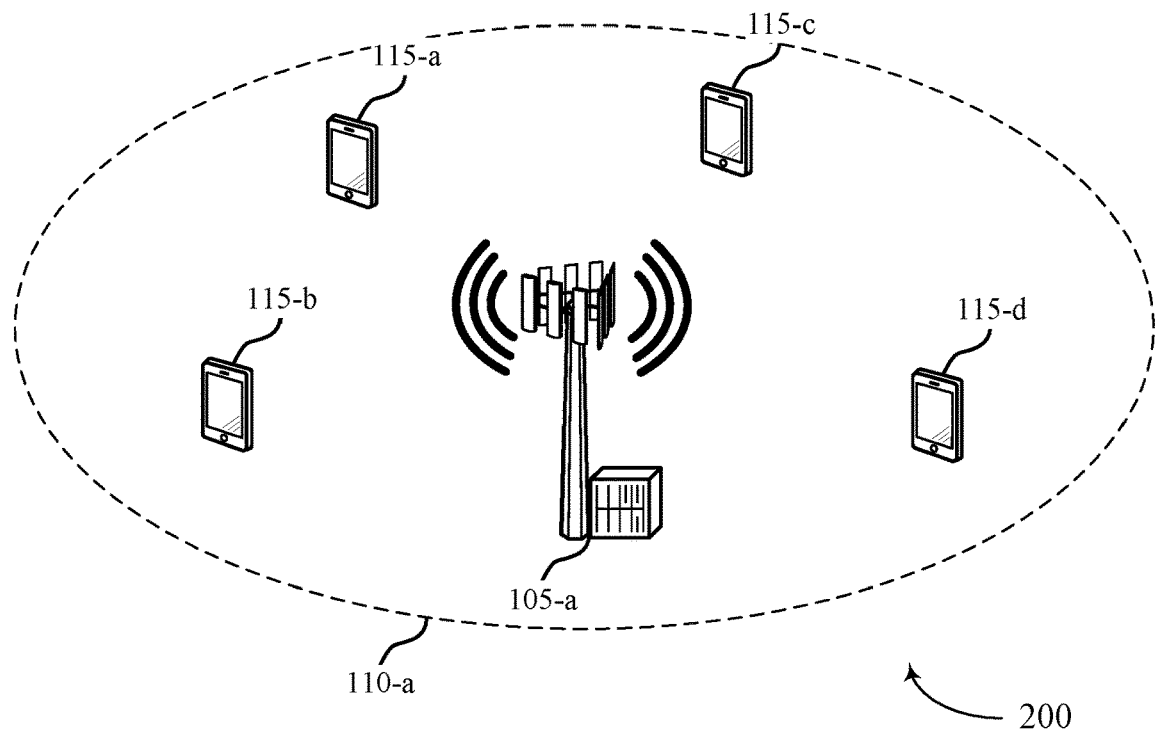

FIG. 2A illustrates an example of a wireless communications system 200 that supports TCI state operation for multi-point transmission in accordance with aspects of the present disclosure. The wireless communications system 200 may include base station 105-a and UEs 115-a, 115-b, 115-c, and 115-d which may be examples of a base station 105 and UEs 115 as described with reference to FIG. 1. Base station 105-a may serve a geographic coverage area 110-a. In some cases, base station 105-a may transmit a broadcast transmission to UEs 115. For example, base station 105-a may omnidirectionally transmit control information and data to UEs 115 within geographic coverage area 110-a. Additionally or alternatively, other wireless devices, such as UEs 115-a, 115-b, 115-c, 115-d or some combination of these UEs 115, may receive control information and data via omnidirectional transmissions from base station 105-a.

In some implementations, base station 105-a may operate in an LTE (or non-beamformed) wireless communications system and may omnidirectionally transmit broadcast transmissions to UEs within a cell served by base station 105-a. For example, base station 105-a may transmit control information to the UEs 115 (e.g., UEs 115-a, 115-b, 115-c, 115-d) within geographic coverage area 110-a simultaneously in a single transmission. In another example, base station 105-a may transmit data to the UEs 115 (e.g., UEs 115-a, 115-b, 115-c, and 115-d) within geographic coverage area 110-a simultaneously in a single transmission. In some cases, a single PDCCH transmission may be used to schedule a single PDSCH transmission to the set of UEs 115. For example, base station 105-a may omnidirectionally transmit a PDCCH transmission that may be received by UEs 115-a, 115-b, 115-c, and 115-d. The UEs 115 may use the PDCCH to identify scheduling information about a PDSCH transmission and may monitor for the PDSCH transmission. The base station may omnidirectionally transmit the PDSCH transmission that may be received by UEs 115-a, 115-b, 115-c, and 115-d.

The approaches applied to conventional single-cell broadcast may not be applied to other systems that use analog beamforming such as NR FR2 systems.

Figure 2B:
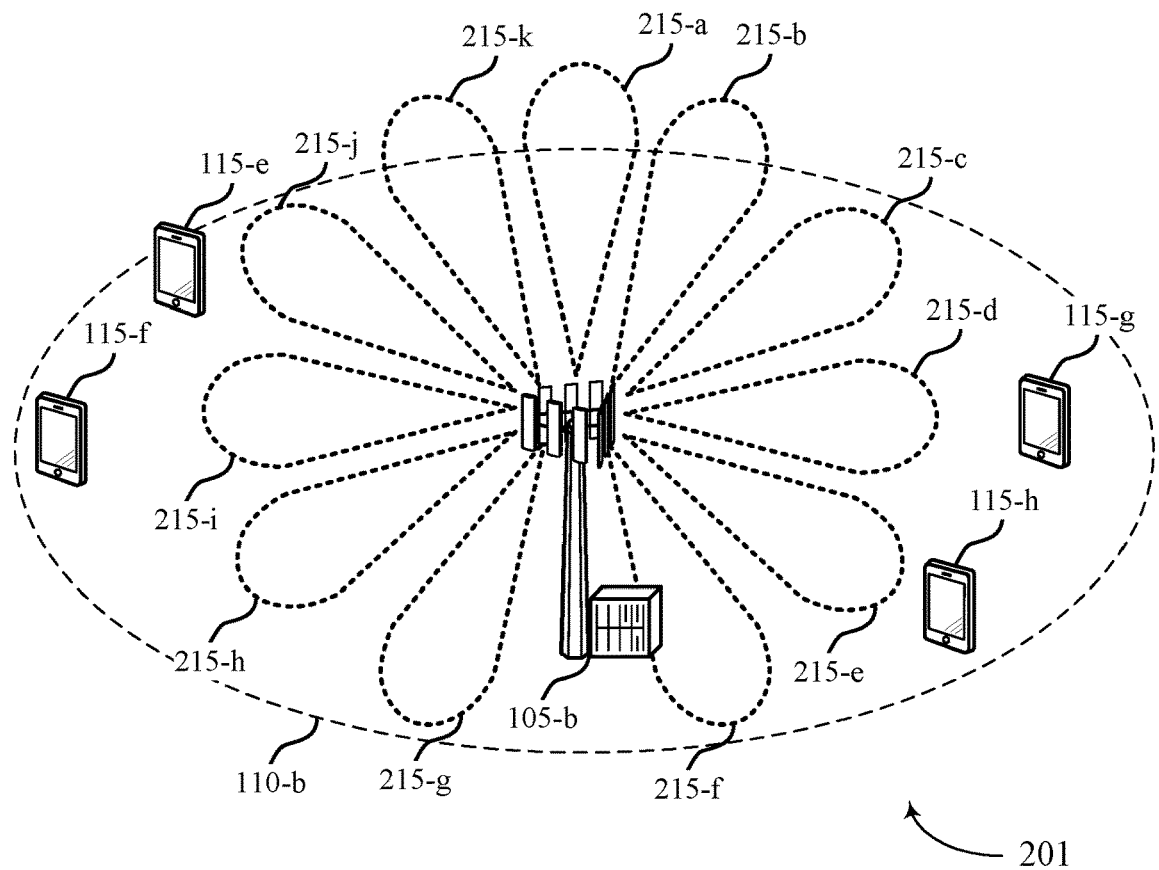

FIG. 2B illustrates an example of a wireless communications system 201 that supports TCI state operation for multi-point transmission in accordance with aspects of the present disclosure. The wireless communications system 201 may include base station 105-b and UEs 115-e, 115-f, 115-g, and 115-h which may be examples of a base station 105 and UEs 115 as described with reference to FIGS. 1 and 2A. Base station 105-b may serve a geographic coverage area 110-b. In some cases, base station 105-b may transmit broadcast transmissions to the UEs 115. For example, base station 105-b may transmit control information and data to UEs 115 within geographic coverage area 110-b using beamforming. Additionally or alternatively, other wireless devices, such as UEs 115-e, 115-f, 115-g, 115-h or some combination of these UEs 115, may receive control information and data via beamformed transmissions from base station 105-b.

Base station 105-b may use beamforming to transmit a transmission in a single direction or a few directions at a time due to resource constraints, and less than all UEs 115 being served by the base station 105 may be able to receive the transmission at the same time. When broadcasting data, the base station 105 may transmit the same broadcast transmission multiple times to reach all UEs 115 served by the base station 105 (e.g., a single or multiple PDCCH transmissions to schedule multiple PDSCH transmissions). In some cases, multiple beams (e.g., analog beams) may be transmitted simultaneously. For example, base station 105-b may transmit using beams 215-a, 215-e, and 215-i at the same time and one or more of UEs 115-e, 115-f, 115-g, and 115-h may receive the beamformed transmission. In some implementations, UEs 115-h and 115-f may receive the beamformed transmissions and UEs 115-e and 115-g may not receive the beamformed transmission from beams 215-a, 215-e, and 215-i. In some cases, one analog beam may be transmitted at a time. For example, base station 105-b may transmit using beam 215-a and no UEs 115 may receive the beamformed transmission.

In some implementations, a base station 105 may transmit a single PDCCH transmission or multiple PDCCH transmissions to schedule multiple PDSCH transmissions using beamforming. The PDCCH may include DCI that may indicate a set of resource allocations (e.g., set of slots, symbol periods, frequency bands, frequency subbands) in which the base station 105 may schedule a data transmission, and a respective TCI state to be used by the base station 105 for transmitting the data transmission in a respective one of the resource allocations. For example, the TCI state may indicate which transmission beam the base station 105 may use to transmit a data transmission in a particular resource allocation. A UE 115 may receive the DCI and select one or more of the resource allocations to monitor for, and subsequently receive, the data transmission. In some cases, the UE 115 may select the one or more resource allocations based on the beam associated with resource allocation. For example, beam 215-i may be the preferred beam of UE 115-f and UE 115-f may select a resource allocation associated with beam 215-i to monitor.

Figure 3A:
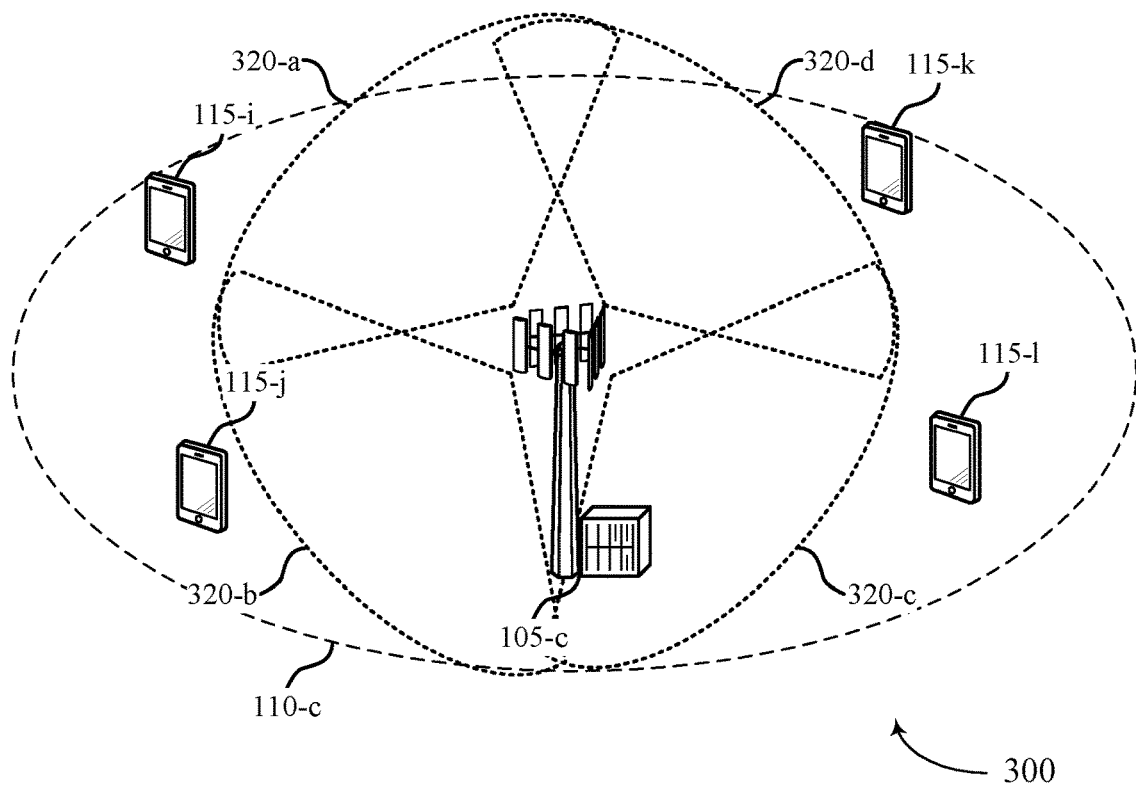

FIG. 3A illustrates an example of a wireless communications system 300 that supports TCI state operation for multi-point transmission in accordance with aspects of the present disclosure. The wireless communications system 300 may include base station 105-c and UEs 115-i, 115-j, 115-k, and 115-1 which may be examples of a base station 105 and UEs 115 as described with reference to FIGS. 1-2B. Base station 105-c may serve a geographic coverage area 110-c. In some cases, base station 105-c may transmit broadcast transmissions to the UEs 115. For example, base station 105-c may transmit control information and data to UEs 115 within geographic coverage area 110-c using beamforming. Additionally or alternatively, other wireless devices, such as UEs 115-i, 115-j, 115-k, 115-1 or some combination of these UEs 115, may receive control information and data via beamformed transmissions from base station 105-c.

Base station 105-c may use beamforming to transmit a broadcast, multicast, or unicast transmission, or a combination thereof to a set of UEs 115. In some implementations (e.g., FR2 broadcast), there may be multiple beam types (e.g., narrow beams, and wide beams). For example, base station 105-c may transmit to one or more UEs 115 using wide beams (e.g., wide beams 320-a, 320-b, 320-c, 320-d, or a combination thereof). Wide beams 320-a, 320-b, 320-c, and 320-b may represent example wide beams the base station may use to transmit to UEs 115 within a cell.

In some implementations, wide beams may cover a greater area than narrow beams such that a low number of wide beams may be used to reach each UE 115 in a serving area. A base station may reduce the amount of time needed to transmit a beamformed transmission to each UE 115 in the geographic coverage 110-c by using wide beams compared to using narrow beams. In some cases, wide beams may be used for low-data rate broadcast data.

In some implementations, each wide beam of a set of wide beams may be located (e.g., quasi co-located) with a respective synchronization signal block (SSB) of a set of SSBs. For example, base station 105-c may beam sweep such that base station 105-c may periodically transmit synchronization signals from each wide beam 320 within a respective SSB. A UE 115 may receive one or more synchronization signals and may measure the signal quality (e.g., reference signal received power (RSRP), reference signal received quality (RSRQ), signal to interference plus noise ratio (SINR)) for each received synchronization signal in each SSB. The UE 115 may determine one or more transmit-receive beam pairs (e.g., preferred beam pairs) based on signal quality measurement of the one or more synchronization signals. The UE 115 may receive signals on one or more wide receive beams associated with the one or more preferred transmission-receive beam pairs.

Wide beams 320 may be used to transmit control information, or data, or a combination thereof. In some cases, base station 105-c may transmit PDCCH transmissions using wide beams 320 to reduce the amount of time needed to transmit control information to the UEs 115 served by base station 105-c.

Figure 3B:
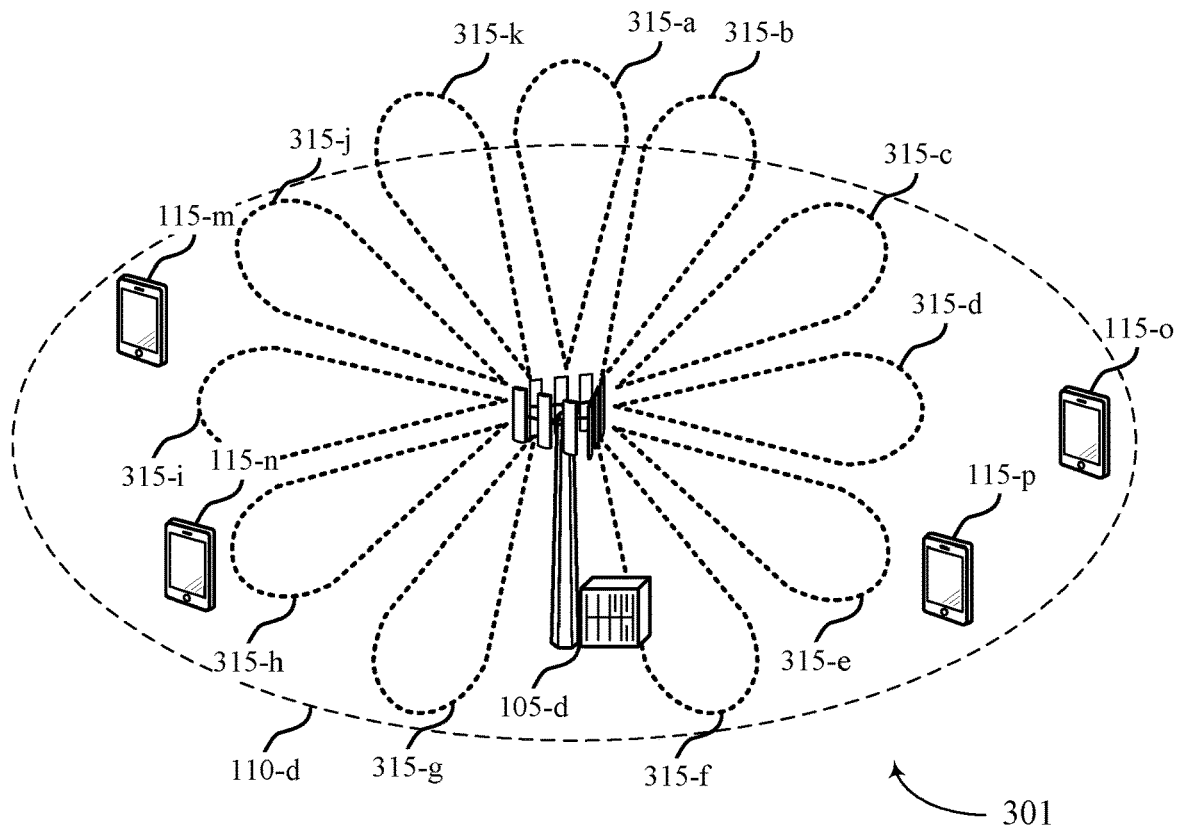

FIG. 3B illustrates an example of a wireless communications system 301 that supports TCI state operation for multi-point transmission in accordance with aspects of the present disclosure. The wireless communications system 301 may include base station 105-d and UEs 115-m, 115-n, 115-o, and 115-p which may be examples of a base station 105 and UEs 115 as described with reference to FIGS. 1-3A. Base station 105-d may serve a geographic coverage area 110-d. In some cases, base station 105-d may transmit broadcast transmissions to the UEs 115. For example, base station 105-d may transmit control information and data to UEs 115 within geographic coverage area 110-d using beamforming. Additionally or alternatively, other wireless devices, such as UEs 115-m, 115-n, 115-o, 115-p or some combination of these UEs 115, may receive control information and data via beamformed transmissions from base station 105-d.

In some implementations, base station 105-d may transmit to UEs 115-m, 115-n, 115-o, and 115-p using narrows beams 315 (e.g., narrow beams 315-a through 315-k). Narrows beams 315-a through 315-k may represent example narrow beams 315 base station 105-d may use to transmit to UEs 115 with the cell. In some implementations, higher data rates may be reached using narrow beams for beamformed transmissions.

In some cases, each narrow beam of a set of narrow beams may be located (e.g., quasi co-located) with a respective channel state information reference signal (CSI-RS) of a set of CSI-RSs. For example, base station 105-d may beam sweep such that base station 105-d may periodically transmit reference signals from each narrow beam 315 using a respective CSI-RS. A UE 115 may receive one or more reference signals and may measure the signal quality (e.g., RSRP, RSRQ, SINR) for each received reference signal. The UE 115 may determine one or more transmission-receive beam pairs (e.g., preferred beam pairs) based on signal quality measurement of the one or more reference signals. The UE 115 may receive signals on one or more narrow receive beams associated with the one or more preferred transmission-receive beam pairs.

Narrow beams 315 may include control information, or data, or a combination thereof. In some cases, base station 105-d may transmit PDCCH transmissions, PDSCH transmissions, or a combination thereof using narrow beams 315 to increase the data rate of beamformed transmissions.

Figure 4:
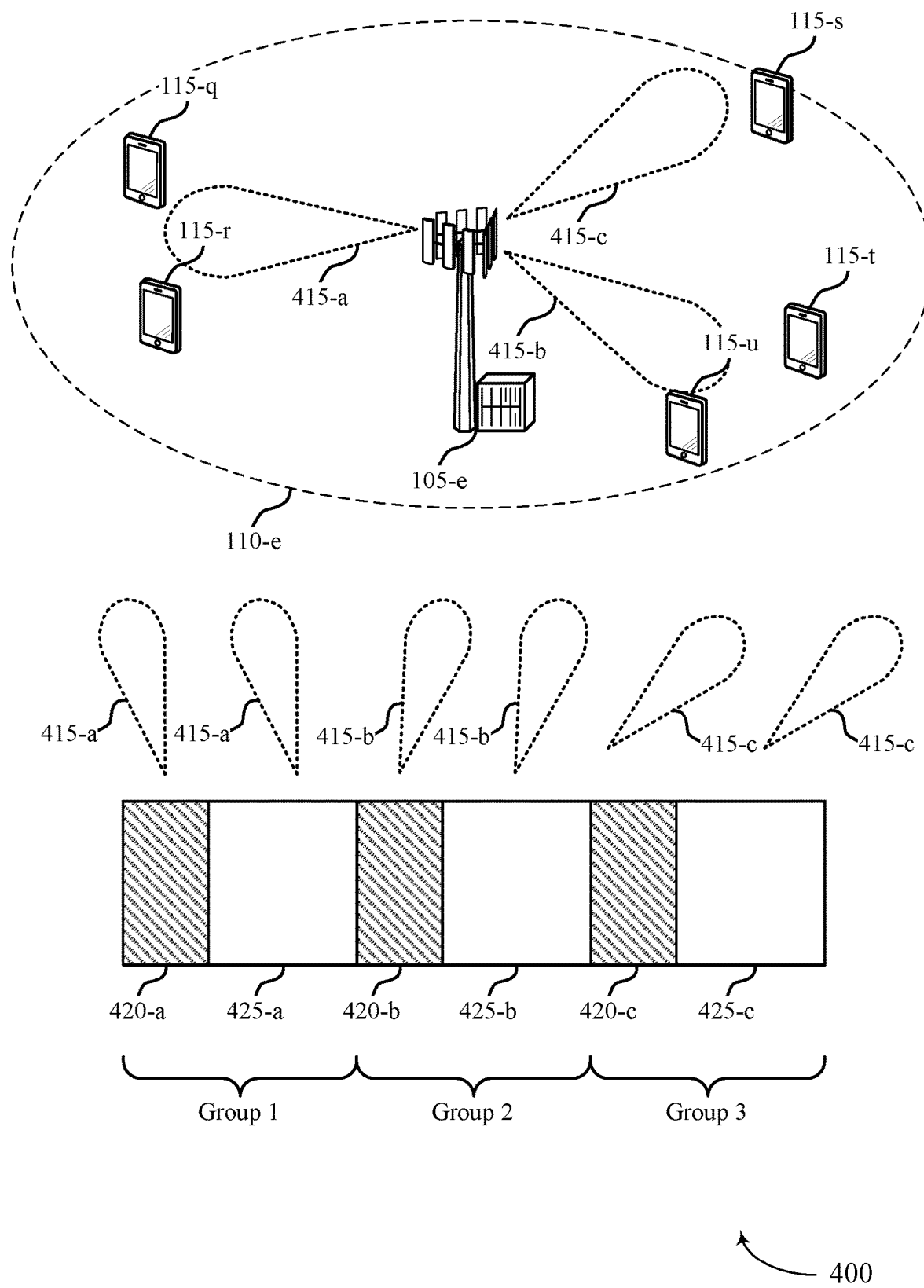

FIG. 4 illustrates an example of a wireless communications system 400 that supports TCI state operation for multi-point transmission in accordance with aspects of the present disclosure. The wireless communications system 400 may include base station 105-e and UEs 115-q, 115-r, 115-s, 115-t, and 115-u which may be examples of a base station 105 and UEs 115 as described with reference to FIGS. 1-3B. Base station 105-e may serve a geographic coverage area 110-e. In some cases, base station 105-e may transmit broadcast transmissions to the UEs 115. For example, base station 105-e may transmit control information and data to UEs 115 within geographic coverage area 110-e using beamforming. Additionally or alternatively, other wireless devices, such as UEs 115-q, 115-r, 115-s, 115-t, 115-u or some combination of these UEs 115, may receive control information and data via beamformed transmissions from base station 105-e.

Base station 105-e may transmit beamformed transmissions to UEs 115-q, 115-r, 115-s, 115-t, 115-u. The beamformed transmissions may include control information (e.g., PDCCH), data (e.g., PDSCH), or a combination thereof. In some implementations, the beamformed transmissions may be transmitted using narrow beams, wide beams, or a combination thereof. In some cases, the same or similar beam width may be used to transmit both the PDSCH transmission and the PDSCH transmission. For example, a PDCCH transmission may be transmitted using a narrow beam (e.g., beam 415-a, 415-b, 415-c) and a PDSCH transmission may be transmitted using a narrow beam (e.g., beam 415-a, 415-b, 415-c). Each beam may be quasi co-located with a CSI-RS as described in FIG. 3B.

In some cases, base station 105-e may transmit one or more PDCCH transmissions on one or more beams 415. A PDCCH may include DCI that may indicate a set of resource allocations for one or more PDSCH transmissions. The DCI may indicate which of multiple beams (e.g., TCI states) is being used to transmit the broadcast or multicast transmission in a respective one of the resource allocations.

The resource allocation may depend on the identifier of a UE, or a group of UEs, or a combination thereof. For example, UEs 115-q and 115-r may be assigned an identifier associated with group 1 (e.g., G-RNTI), UEs 115-t and 115-u may be assigned an identifier associated with group 2 (e.g., G-RNTI), and UE 115-s may be assigned a group identifier associated with group 3 (e.g., G-RNTI). Each UE 115 may also be assigned an individual identifier (e.g., C-RNTI) that may be unique to the UE 115. The identifier assigned to a UE 115 or a group of UEs 115 may be used to scramble and descramble DCI and identify information associated with the UE 115 or group of UEs 115.

In some cases, the UEs 115 of a group may receive a PDCCH in a resource allocation 420 from base station 105-e and may identify in the DCI, upon descrambling the DCI, a TCI state associated with group 1, when the group identifier of group 1 is used to successfully used to decode the DCI. For example, the UEs 115 of group 1 may receive PDCCH in resource allocation 420-*a* that may include DCI. The DCI may include a TCI state that may indicate that the UEs 115 of group 1 should monitor for a PDSCH transmission in resource allocation 425-*a* on the same beam that was used for receiving PDCCH in resource allocation 420-*a* (e.g., beam 415-*a*). In another example, the UEs 115 of group 2 may receive DCI in resource allocation 420-*b* that may include a TCI state that indicates that the same beam the UEs 115 used to receive the PDCCH in resource allocation 420-*b* should be used to receive PDSCH in resource allocation 425-*b* (e.g., beam 415-*b*). In another example, the UEs 115 of group 3 may receive DCI in resource allocation 420-*c* that may include a TCI state that indicates that the same beam the UEs 115 used to receive the PDCCH in resource allocation 420-*c* should be used to receive the PDSCH transmission in resource allocation 425-*c* (e.g., beam 415-*b*). In some cases, the PDCCH transmissions and PDSCH transmissions may be associated with individual UEs 115 rather than groups of UE 115.

Figure 5A:
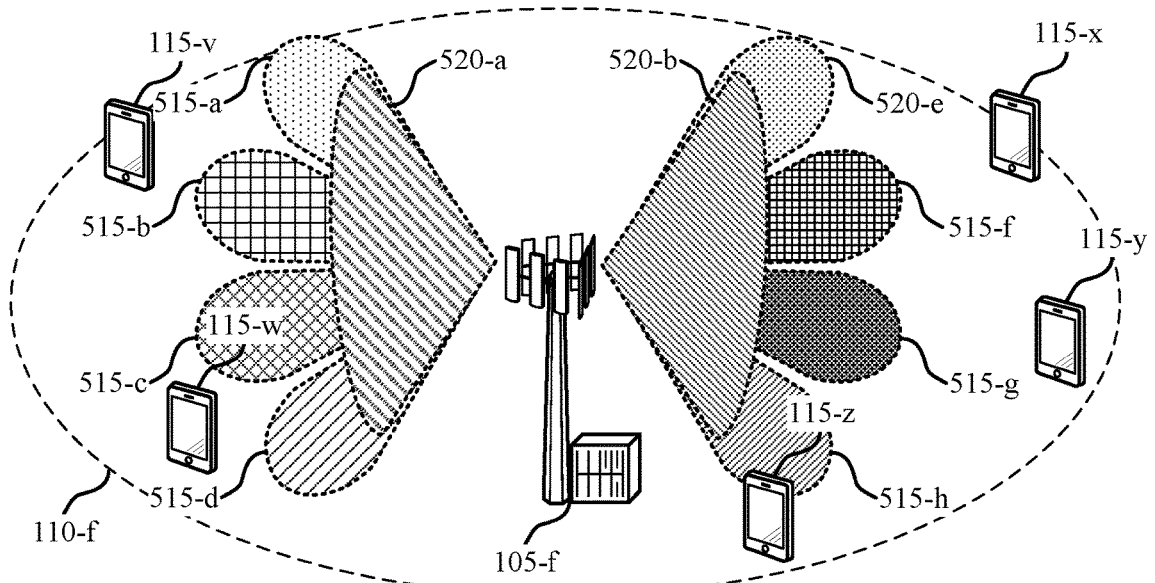
FIG. 5A-5C illustrate examples of resource allocations for wireless communications systems that support TCI state operation for multi-point transmission in accordance with aspects of the present disclosure.
Figure 5A:
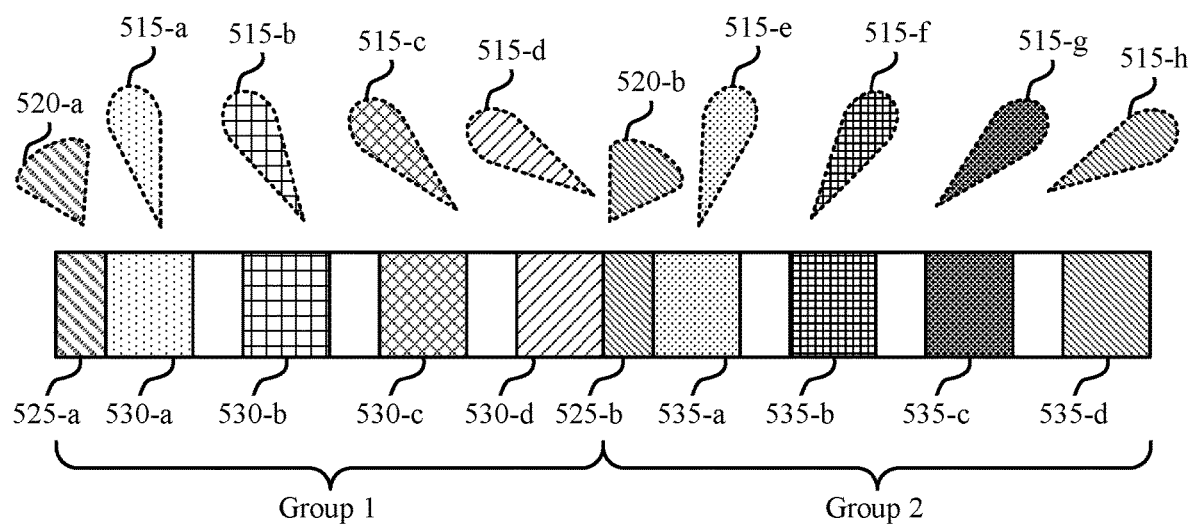
Figure 5B:
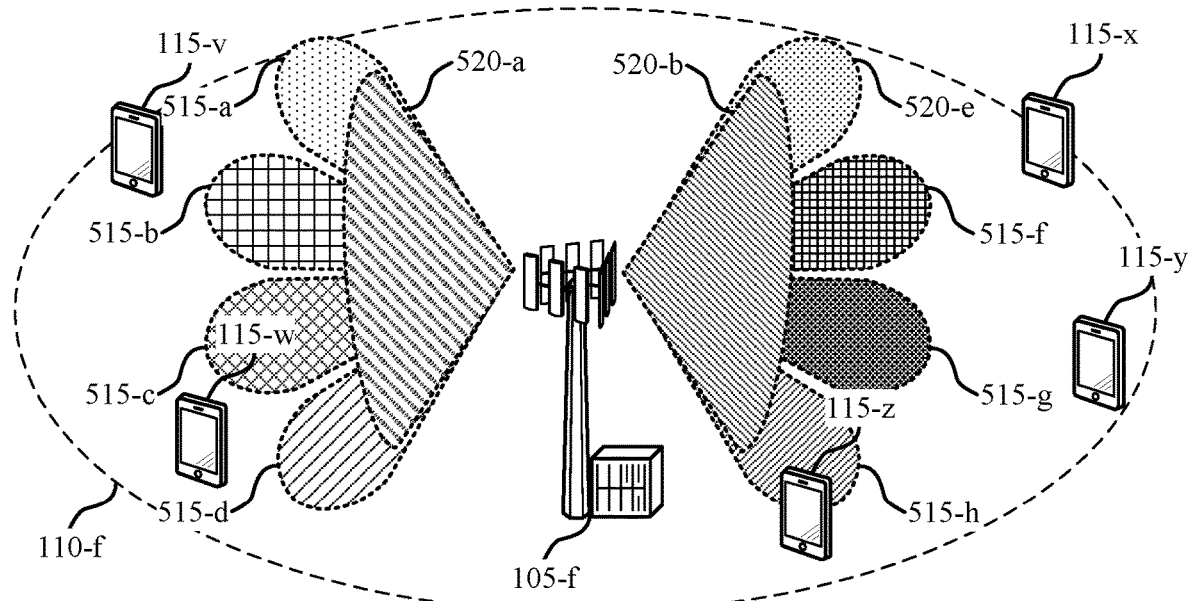
Figure 5B:
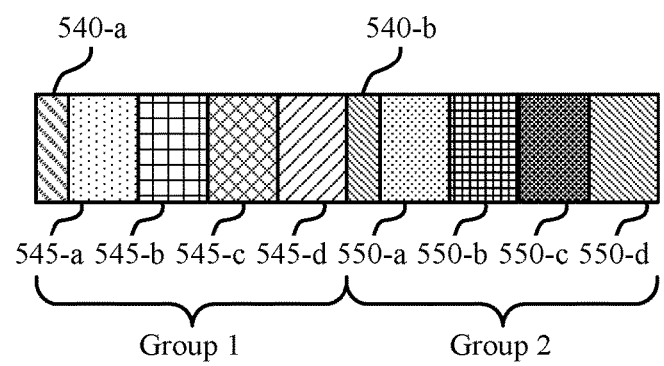
Figure 5C:
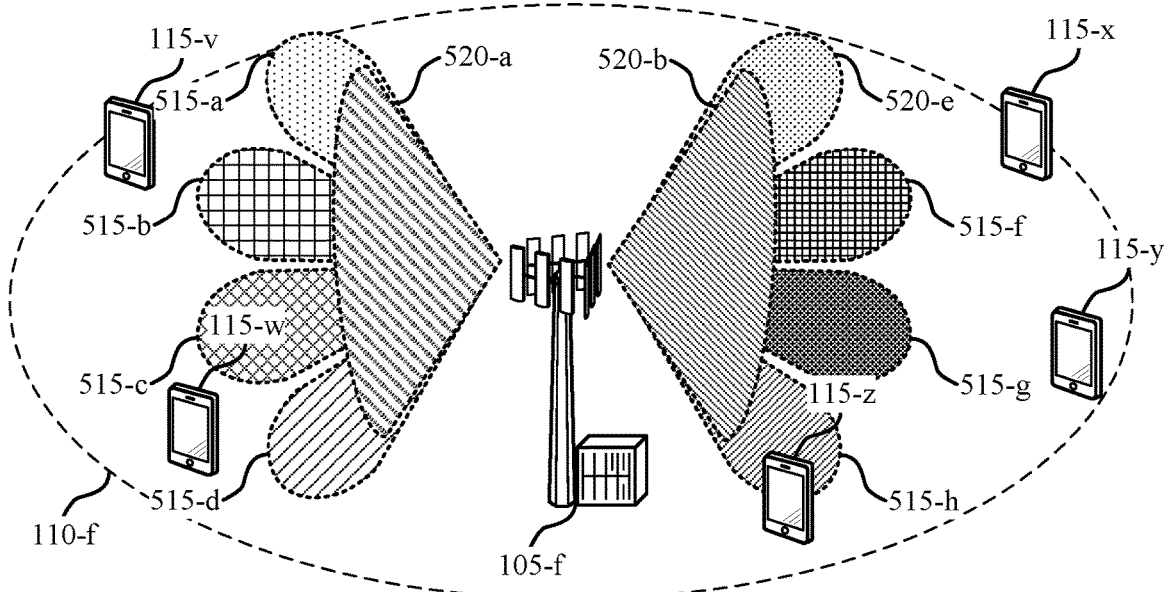
Figure 5C:
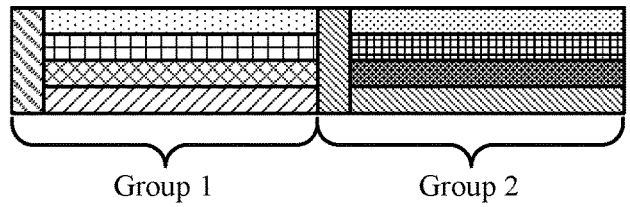

FIGS. 5A, 5B, and 5C illustrate examples of resource allocations for wireless communications systems 500, 501, and 502 that support TCI state operation for multi-point transmission in accordance with aspects of the present disclosure. The wireless communications systems 500, 501, and 502 may include base station 105-*f* and UEs 115-*v*, 115-*w*, 115-*x*, 115-*y*, and 115-*z* which may be examples of a base station 105 and UEs 115 as described with reference to FIGS. 1-4. Base station 105-*f* may serve a geographic coverage area 110-*f*. In some cases, base station 105-*f* may transmit broadcast transmissions to the UEs 115. For example, base station 105-*f* may transmit control information and data to UEs 115 within geographic coverage area 110-*f* using beamforming. Additionally or alternatively, other wireless devices, such as UEs 115-*v*, 115-*w*, 115-*x*, 115-*y*, 115-*z* or some combination of these UEs 115, may receive control information and data via beamformed transmissions from base station 105-*f*.

In NR or other FR2 systems, a base station 105 may use beamforming to transmit a transmission in a single direction or a few directions at a time. When broadcasting data using beamforming, a base station 105 may not have sufficient hardware to transmit on all available beams in a beamforming codebook, and the base station 105 may have to transmit a same broadcast transmission multiple times to reach all UEs 115 served by the base station 105. For example, a base station 105 may transmit one or more PDCCH transmissions using multiple beams pointed in different directions to reach all served UEs 115 and schedule multiple PDSCH transmissions with the UEs 115. Each PDCCH transmission may include DCI that may indicate a set of resource allocations for the multiple PDSCH transmissions and a respective TCI state for each of the resource allocations. In some implementations, a PDCCH transmission may be transmitted using a wide beam and the one or more PDSCH transmissions may be transmitted using one or more narrow beams. The wide beams may be quasi co-located with respective SSBs and the narrow beams may be quasi co-located with respective CSI-RSs.

The DCI may indicate which of multiple beams (e.g., via TCI states) are being used to transmit the broadcast or multicast transmission in a respective one of the resource allocations. TCI states may be used in cases where a base station 105 may communicate with a UE 115 using multiple antennas. Data streams may be mapped to the antennas using antenna ports. In some cases, a base station may transmit an indication to a UE of the quasi co-located relationships between antenna ports used for downlink communications with the UE. Such an indication may be referred to as a TCI. Different TCI-states may correspond to different quasi co-located relationships between antenna ports used for downlink communication with a UE. For example, a TCI-state may indicate a quasi co-located relationship between a reference signal resource (e.g., a tracking reference signal (TRS), an SSB, a CSI-RS) and a UE target reference signal (e.g., demodulation reference signal (DM-RS)).

In some cases, the resource allocations indicated in the DCI may be TDM across slots, TDM within a slot, or FDM within a slot, or a combination thereof. For example, the base station 105 may indicate in the DCI which resource allocation the base station 105 may use to transmit PDSCH transmissions and may include one or more TCI states that assigns a TCI state to indicate a particular transmission beam that may be used to transmit a PDSCH transmission within a specific resource allocation. A UE 115 may receive the DCI, identify a respective TCI state assigned to each resource allocation as indicated in DCI, and identify a receive beam to use to receive a PDSCH transmission for a particular resource allocation that corresponds to the transmission beam indicated in the TCI state. The UE 115 may monitor one or more of the resource allocations to receive the PDSCH transmission using a receive beam that corresponds to a TCI state of the one or more resource allocations being monitored.

For example, base station 105-*f* may transmit broadcast, multicast, or unicast transmissions on one or more of its narrow beams (e.g., beams 515-*a*, 515-*b*, 515-*c*, 515-*d*, 515-*e*, 515-*f*, 515-*g*, 515-*h*), and on or more of its wide beams (e.g., beams 520-*a*, 520-*b*). The narrow beams may be used to transmit PDSCH transmissions and the wide beams may be used to transmit the PDCCH transmissions. For example, base station 105-*f* may transmit a PDCCH in slot 525-*a* on wide beam 520-*a*.

In some cases, UEs 115-*v* and 115-*w* may be associated with group 1 and UEs 115-*x*, 115-*y*, and 115-*z* may be associated with group 2. Each group may be assigned a unique identifier (e.g., G-RNTI). The UEs of group 1 may receive PDCCH transmission in slot 525-*a* transmitted on wide beam 520-*a*. Based on the received PDCCH transmission, the UEs 115 of group 1 may identify a resource allocation type applied to the PDSCH, and identify respective TCI states assigned to each resource allocation as indicated in the DCI. For example, the DCI of the PDCCH may indicate that the resource allocation type is TDM across slots. The DCI may also indicate one or more TCI states. For example, one TCI state may indicate that a PDSCH may be transmitted on beam 515-*a* in slot 530-*a*. Other TCI states may indicate that a PDSCH may be transmitted on beam 515-*b* in slot 530-*b*, transmitted on beam 515-*c* in slot 530-*c*, or transmitted on beam 515-*d* in slot 530-*d*. The UEs 115 of group 1 may identify a receive beam to use to receive a PDSCH transmission for a particular resource allocation that corresponds to the transmission beam indicated in the TCI states. For example, UE 115-*v* may identify beam 515-*b* as a preferred beam and may monitor for the PDSCH on beam 515-*b* in slot 530-*b*.

In another example, the UEs of group 2 may receive a PDCCH transmission in slot 525-*b* transmitted on wide beam 520-*b*. Based on the received PDCCH transmission, the UEs 115 of group 2 may identify a resource allocation type applied to the PDSCH, and identify respective TCI states assigned to each resource allocation as indicated in the DCI. For example, the DCI may indicate that the resource allocation type is TDM across slots and may indicate one or more TCI states. For example, one TCI state may indicate that a PDSCH may be transmitted on beam 515-*e* in slot 535-*a*. Other TCI states may indicate that a PDSCH may be transmitted on beam 515-*f* in slot 535-*b*, transmitted on beam 515-*g* in slot 535-*c*, and transmitted on beam 515-*h* in slot 535-*d*. The UEs 115 of group 2 may identify a receive beam to use to receive a PDSCH transmission for a particular resource allocation that corresponds to the transmission beam indicated in the TCI states. For example, UE 115-*z* may identify beam 515-*h* as a preferred beam and may monitor for the PDSCH on beam 515-*h* in slot 535-*d*.

FIG. 5B illustrates a resource allocation for wireless communications system 501. The resource allocation may be indicated in DCI, as described in FIG. 5A. For example, the resource allocation represented in FIG. 5B may be TDM within a slot.

For example, as with FIG. 5A, UEs 115-*v* and 115-*w* may be associated with group 1 and UEs 115-*x*, 115-*y*, and 115-*z* may be associated with group 2. Each group may be assigned a unique identifier (e.g., G-RNTI). The UEs of group 1 may receive PDCCH transmission in symbol 540-*a* transmitted on wide beam 520-*a*. Based on the received PDCCH transmission, the UEs 115 of group 1 may identify a resource allocation type applied to the PDSCH, and identify respective TCI states assigned to each resource allocation as indicated in the DCI. For example, the DCI of the PDCCH may indicate that the resource allocation type is TDM within a slot. The DCI may also indicate one or more TCI states. For example, one TCI state may indicate that a PDSCH may be transmitted on beam 515-*a* in symbol 545-*a* (or a mini-slot). Other TCI states may indicate that a PDSCH may be transmitted on beam 515-*b* in symbol 545-*b*, transmitted on beam 515-*c* in symbol 545-*c*, and transmitted on beam 515-*d* in symbol 545-*d*. The UEs 115 of group 1 may identify a receive beam to use to receive a PDSCH transmission for a particular resource allocation that corresponds to the transmission beam indicated in the TCI states. For example, UE 115-*v* may identify beam 515-*b* as a preferred beam and may monitor for the PDSCH on beam 515-*b* in symbol 555-*b*.

FIG. 5C illustrates a resource allocation for wireless communications system 502. The resource allocation may be indicated in DCI, as described in FIG. 5A. For example, the resource allocation represented in FIG. 5C may be FDM within a slot.

For example, as with FIG. 5A, UEs 115-*v* and 115-*w* may be associated with group 1 and UEs 115-*x*, 115-*y*, and 115-*z* may be associated with group 2. Each group may be assigned a unique identifier (e.g., G-RNTI). The UEs of group 1 may receive PDCCH transmission in symbol 555-*a* transmitted on wide beam 520-*a*. Based on the received PDCCH transmission, the UEs 115 of group 1 may identify a resource allocation type applied to the PDSCH, and identify respective TCI states assigned to each resource allocation as indicated in the DCI. For example, the DCI of the PDCCH may indicate that the resource allocation type is FDM within a slot. The DCI may also indicate one or more TCI states. For example, one TCI state may indicate that a PDSCH may be transmitted on beam 515-*a* in frequency band 560-*a* (e.g., one or more sub-carriers, resource blocks, BWPs). Other TCI states may indicate that a PDSCH may be transmitted on beam 515-*b* in frequency band 560-*b*, transmitted on beam 515-*c* in frequency band 560-*c*, and transmitted on beam 515-*d* in frequency band 560-*d*. The UEs 115 of group 1 may identify a receive beam to use to receive a PDSCH transmission for a particular resource allocation that corresponds to the transmission beam indicated in the TCI states. For example, UE 115-*v* may identify beam 515-*b* as a preferred beam and may monitor for the PDSCH on beam 515-*b* in frequency band 560-*b*.

Figure 6:
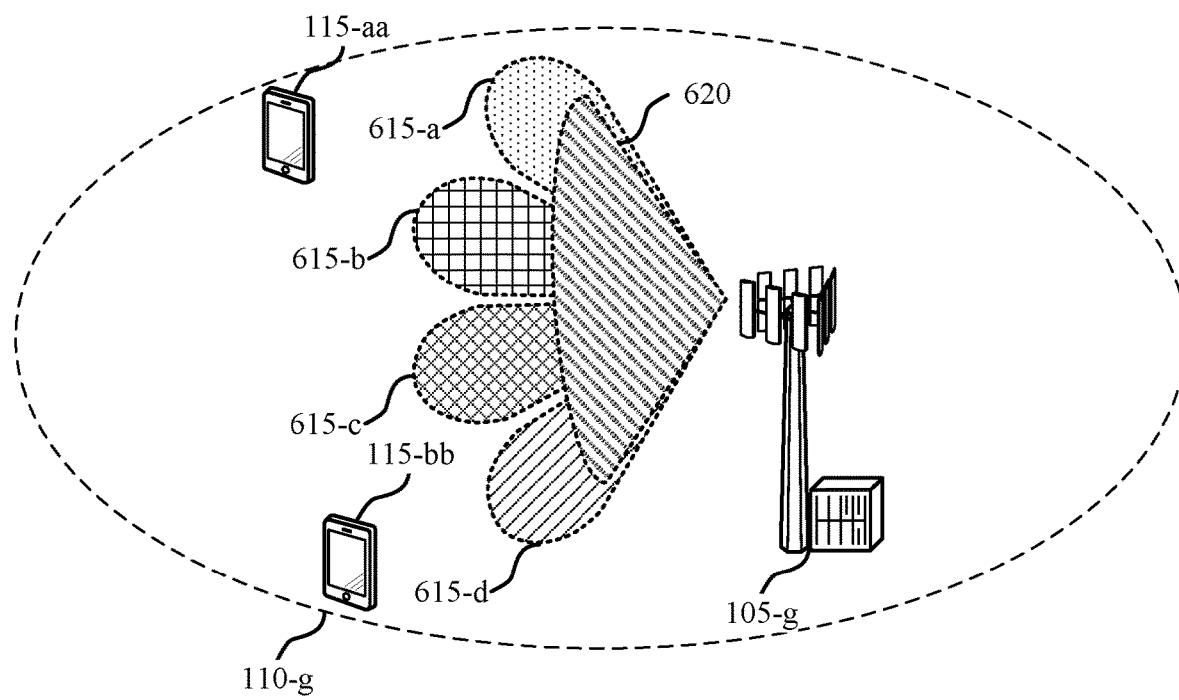
FIG. 6 illustrates an example of a system for wireless communications that supports TCI state operation for multi-point transmission in accordance with aspects of the present disclosure.
Figure 6:
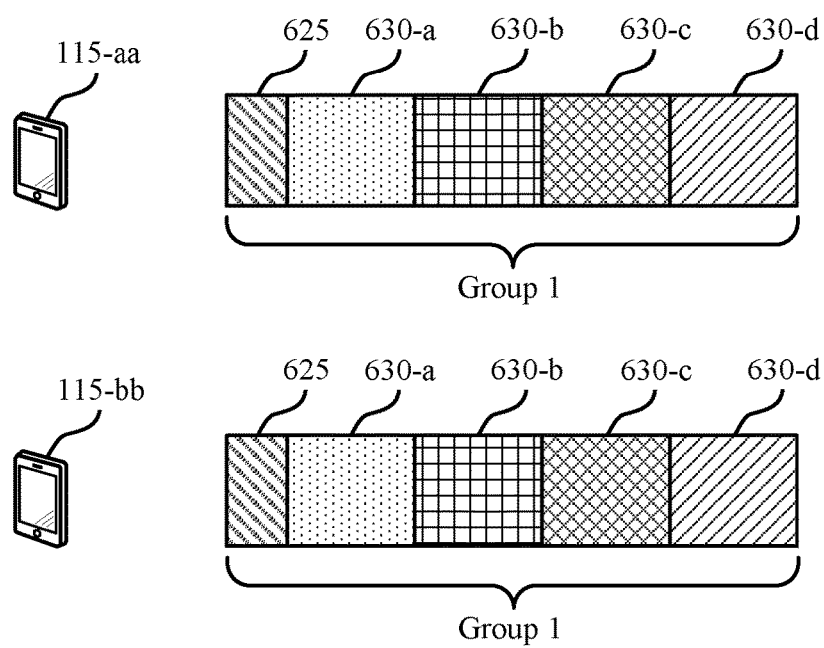

FIG. 6 illustrates an example of a wireless communications system 600 that supports TCI state operation for multi-point transmission in accordance with aspects of the present disclosure. The wireless communications system 600 may include base station 105-*g* and UEs 115-*aa*, and 115-*bb* which may be examples of a base station 105 and UEs 115 as described with reference to FIGS. 1-5C. Base station 105-*g* may serve a geographic coverage area 110-*g*. In some cases, base station 105-*g* may transmit broadcast transmissions to the UEs 115. For example, base station 105-*g* may transmit control information and data to UEs 115 within geographic coverage area 110-*g* using beamforming. Additionally or alternatively, other wireless devices, such as UEs 115-*aa*, 115-*bb* or some combination of these UEs 115, may receive control information and data via beamformed transmissions from base station 105-*g*.

A base station 105 may configure a UE 115 with multiple TCI state sets. A first TCI state set may indicate active TCI states to be used for multicast or broadcast transmissions from the base station to a group of UEs. A second TCI state set may indicate active TCI states to be used for unicast transmissions from the base station 105 to a specific UE 115. The base station 105 may indicate to the UE 115 which TCI state set to use based on how the DCI is scrambled. For example, depending on a unicast or multicast PDSCH transmission, the base station 105 may scramble the DCI differently. If the base station 105 is scheduling a unicast PDSCH transmission, the base station 105 may scramble the DCI using the C-RNTI of an individual UE 115. In some examples, if the base station 105 is scheduling a multicast or broadcast PDSCH transmission to a group of UEs 115, the base station 105 may scramble the DCI using a G-RNTI of a group of UEs 105.

A UE 115 (e.g., UE 115-*aa*, UE 115-*bb*) may monitor a control channel (e.g., PDCCH) and process a signal received within the control channel to determine a received bit sequence. The UE 115 (e.g., UE 115-*aa*, UE 115-*bb*) may descramble the received bit sequence using the group identifier (e.g., G-RNTI) of a group that includes the UE 115 (e.g., UE 115-*aa*, UE 115-*bb*), and process the descrambled bit sequence to determine if the descrambled bit sequence includes DCI addressed to the group (e.g., group 1). If, for example, an error (e.g., CRC error) is detected in the descrambled bit sequence, or the descrambled CRC bits of the DCI, or both, then the UE 115 (e.g., UE 115-*aa*, UE 115-*bb*) discards the descrambled bit sequence and determines that the descrambled bit sequence did not include DCI addressed to the group (e.g., group 1). If, for example, an error (e.g., a CRC error) is not detected in the descrambled bit sequence, or the descrambled CRC bits of the DCI, or both, then the UE 115 (e.g., UE 115-*aa*, UE 115-*bb*) determines that the descrambled bit sequence includes DCI addressed to the group (e.g., group 1). The UE 115 (e.g., UE 115-*aa*, UE 115-*bb*) may then determine that the UE 115 is to use the broadcast/multicast active TCI state set (and not the unicast active TCI state set) based on successfully decoding the DCI that is addressed to the group of UEs 115 (e.g., UE 115-*aa*, UE 115-*bb*) that includes the UE 115 (e.g., UE 115-*aa*, UE 115-*bb*). The DCI may provide an index (e.g., a TCI codepoint) that may indicate a particular active TCI state from the broadcast or multicast TCI state set that may be used for transmitting a broadcast or multicast transmission to the UE group (e.g., group 1) within a resource allocation that is also indicated in the DCI. The UE 115 (e.g., UE 115-*aa*, UE 115-*bb*) may monitor the resource allocation using a receive beam that corresponds to the particular active TCI state to receive the broadcast/multicast transmission. Table 1 may be an example of a TCI state set for multicast/broadcast transmissions for a group of UEs 115 e.g., group 1) with which a UE 115 may be configured, and, in some examples, a different TCI state set may be configured for each UE group of a set of UE groups. For example, a DCI may include a TCI codepoint 0 through 7 where each codepoint may indicate a TCI state from a TCI state set for group 1 as depicted below in Table 1, and other TCI state sets may be similarly configured for other UE groups.

TABLE 1

| TCI state set for Multicast/broadcast for group 1 (activated by MAC-CE for broadcast) | |
|---|---|
| TCI codepoint | TCI state ID |
| 0 | TCI state #2 |
| 1 | TCI state #4 |
| 2 | TCI state #6 |
| 3 | TCI state #8 |
| 4 | |
| 5 | |
| 6 | |
| 7 | |

For example, UEs 115-*aa* and 115-*bb* may be assigned to group 1 which may be associated with a group identifier (e.g., G-RNTI) and UEs 115-*aa* and 115-*bb* may receive a PDCCH in resource allocation 625. UE 115-*aa* and UE 115-*bb* may descramble the received bit sequence using the group identifier (e.g., G-RNTI) of group 1, and process the descrambled bit sequence to determine if the descrambled bit sequence includes DCI addressed to group 1. In some cases, the descrambled bit sequence may pass error detection, and UE 115-*aa* and UE 115-*bb* may determine that the descrambled bit sequence includes DCI addressed to group 1. UE 115-*aa* and UE 115-*bb* may determine that each UE 115 should use the broadcast/multicast active TCI state set (e.g., and not the unicast active TCI state set) based on successfully decoding the DCI that is addressed to group 1. The DCI may provide an index (e.g., a TCI codepoint) that may indicate a particular active TCI state from the broadcast/multicast TCI state set that is being used for transmitting a broadcast/multicast transmission to the UEs 115 within group 1 within a resource allocation that is also indicated in the DCI. For example, a TCI state may indicate that beam 615-*a* is associated with resource allocation 630-*a*, beam 615-*b* is associated with resource allocation 630-*b*, beam 615-*c* is associated with resource allocation 630-*c*, and beam 615-*d* is associated with resource allocation 630-*d*. UE 115-*aa* and UE 115-*bb* may monitor the resource allocation (e.g., resource allocation 630-*a*, 630-*b*, 630-*c*, and 630-*d*) using a receive beam that corresponds to the particular active TCI state to receive the broadcast/multicast transmission. The UE 115 may monitor more than one resource allocation or may monitor one resource allocation based on a preferred beam of the UE 115. For example, beam 615-*d* may be the preferred beam of UE 115-*bb* so UE 115-*bb* may monitor resource allocation 630-*d*.

In some cases, the descrambled bit sequence may fail error detection, and UE 115-*aa* and UE 115-*bb* may discard the descrambled bit sequence and determine that the descrambled bit sequence did not include DCI addressed to group 1. In some cases, UEs 115-*aa* and 115-*bb* may attempt to descramble the bit sequence with an individual identifier (e.g., C-RNTI).

Figure 7:
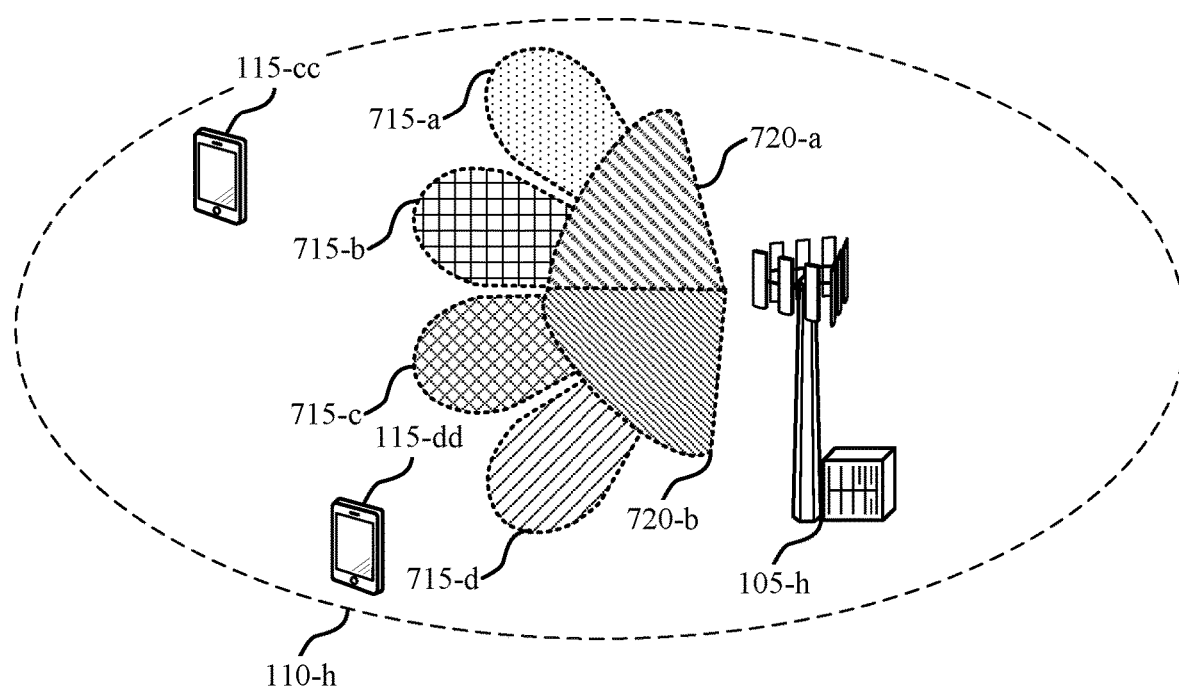
FIG. 7 illustrates an example of a system for wireless communications that supports TCI state operation for multi-point transmission in accordance with aspects of the present disclosure.
Figure 7:
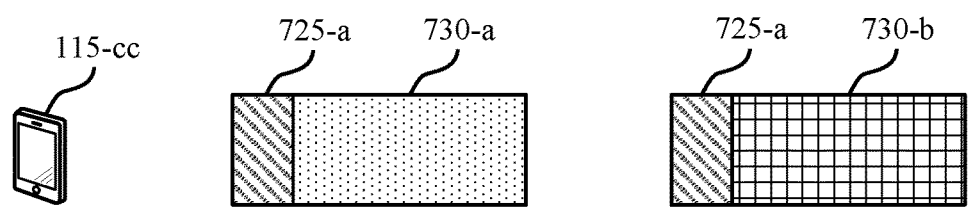
Figure 7:
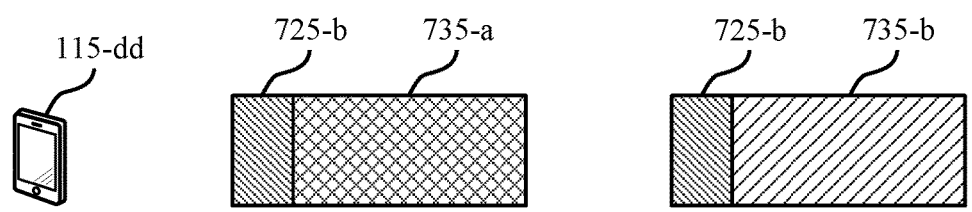
Figure 7:
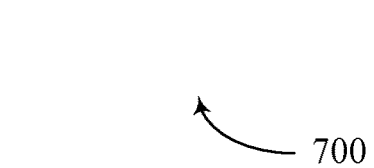

FIG. 7 illustrates an example of a wireless communications system 700 that supports TCI state operation for multi-point transmission in accordance with aspects of the present disclosure. The wireless communications system 700 may include base station 105-*h* and UEs 115-*cc*, and 115-*dd* which may be examples of a base station 105 and UEs 115 as described with reference to FIGS. 1-6. Base station 105-*h* may serve a geographic coverage area 110-*h*. In some cases, base station 105-*h* may transmit unicast transmissions to the UEs 115. For example, base station 105-*h* may transmit control information and data to UEs within geographic coverage area 110-*h* using beamforming. Additionally or alternatively, other wireless devices, such as UEs 115-*cc*, 115-*dd* or some combination of these UEs 115, may receive control information and data via beamformed transmissions from base station 105-*h*.

A base station 105 may configure a UE 115 with multiple active TCI state sets. Depending on an identifier (e.g., C-RNTI, G-RNTI) of the received PDCCH, different TCI indexing (e.g., quasi co-location mapping) may be used. In some cases, two different CSI-RS resource sets may be configured for broadcast/multicast and unicast transmissions. For example, a first active TCI state set may indicate active TCI states to be used for multicast or broadcast transmissions from the base station to a group of UEs. A second active TCI state set may indicate active TCI states to be used for unicast transmissions from the base station 105 to a specific UE 115. The base station 105 may indicate to the UE 115 which active TCI state set to use based on how the DCI is scrambled. For example, depending on a unicast or multicast PDSCH transmission, the base station 105 may scramble the DCI differently. If the base station 105 is scheduling a unicast PDSCH transmission, the base station 105 may scramble the DCI using the C-RNTI of an individual UE 115. In some examples, if the base station 105 is scheduling a multicast or broadcast PDSCH transmission to a group of UEs 115, the base station 105 may scramble the DCI using a G-RNTI of a group of UEs 105. In some cases, separate MAC control elements may be used to update activated TCI states.

A UE 115 (e.g., UE 115-*cc*, UE 115-*dd*) may monitor a control channel (e.g., PDCCH) and process a signal received within the control channel to determine a received bit sequence. The UE 115 (e.g., UE 115-*cc*, UE 115-*dd*) may descramble the received bit sequence using an individual identifier of the UE 115 (e.g., C-RNTI) and process the descrambled bit sequence to determine if the descrambled bit sequence includes DCI addressed to the UE 115 (e.g., UE 115-*cc*, UE 115-*dd*). If, for example, the descrambled bit sequence fails error detection, then the UE 115 (e.g., UE 115-*cc*, UE 115-*dd*) may discard the descrambled bit sequence and determine that the descrambled bit sequence did not include DCI for the UE 115 (e.g., UE 115-*cc*, UE 115-*dd*). If, for example, the descrambled bit sequence passes error detection, then the UE 115 (e.g., UE 115-*cc*, UE 115-*dd*) may determine that the descrambled bit sequence may include DCI addressed to the UE 115 (e.g., UE 115-*cc*, UE 115-*d*). The UE 115 (e.g., UE 115-*cc*, UE 115-*dd*) may then determine that the UE 115 is to use the unicast active TCI state set (and not the broadcast/multicast active TCI state set) based on successfully decoding the DCI that is addressed to the UE 115 (e.g., UE 115-*cc*, UE 115-*dd*). The DCI may provide an index (e.g., a TCI codepoint) that may indicate a particular active TCI state from the unicast active TCI state set that may be used for transmitting a unicast transmission to the UE 115 within a resource allocation that is also indicated in the DCI. The UE 115 may monitor the resource allocation using a receive beam that corresponds to the particular active TCI state to receive the unicast transmission. Table 2 may be an example of a TCI state set for unicast transmissions that a UE 115 may be configured with. For example, a DCI may include a TCI codepoint 0 through 7 where each codepoint may indicate a TCI state.

TABLE 2

TCI state set for unicast (activated by MAC-CE for unicast)

| TCI codepoint | TCI state ID |
|---|---|
| 0 | TCI state #2 |
| 1 | TCI state #5 |
| 2 | TCI state #11 |
| 3 | TCI state #13 |
| 4 | TCI state #25 |
| 5 | TCI state #63 |
| 6 | |
| 7 | |

For example, UE 115-cc may monitor a control channel (e.g., PDCCH in resource allocation in 725-a) and process a signal received within the control channel to determine a received bit sequence. UE 115-cc may descramble the received bit sequence using an individual identifier of UE 115-cc (e.g., C-RNTI) and process the descrambled bit sequence to determine if the descrambled bit sequence includes DCI addressed to UE 115-cc. In some cases, the descrambled bit sequence may pass error detection, and UE 115-cc may determine that the descrambled bit sequence includes DCI addressed to UE 115-cc. UE 115-cc may determine that UE 115-cc is to use the unicast active TCI state set (and not the broadcast/multicast active TCI state set) based on successfully decoding the DCI that is addressed to UE 115-cc.

The DCI may provide an index (e.g., a TCI codepoint) that may indicate a particular active TCI state from the unicast active TCI state set that may be used for transmitting a unicast transmission to UE 115-cc within a resource allocation that is also indicated in the DCI. For example, a TCI state may indicate that 715-a is associated with resource allocation 730-a and beam 715-b is associated with resource allocation 730-b. In some cases, resource allocations 730-a and 730-b may be the same. UE 115-cc may monitor the resource allocation using a receive beam that corresponds to the particular active TCI state to receive the unicast transmission. For example, UE 115-cc may monitor for beams 715-a and 715-b in resource allocations 730-a and 730-b simultaneously or UE 115-cc may identify a preferred beam based on signal measurements and may monitor the resource allocation associated with that beam 715. For example, beam 715-b may be the preferred beam of UE 115-cc so UE 115-cc may monitor resource allocation 730-b for beam 715-b.

Figure 8:
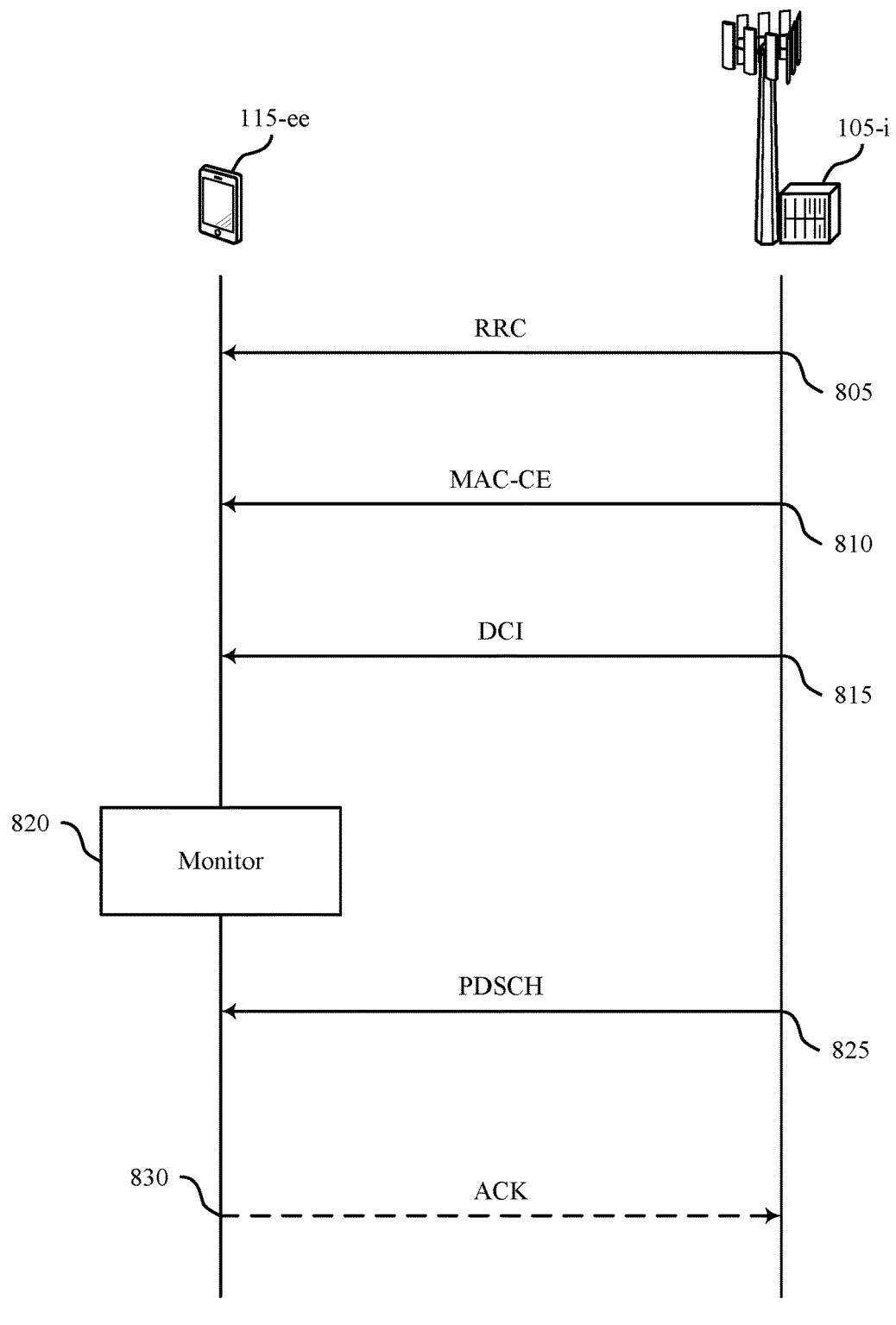
FIG. 8 illustrates an example of a process flow that supports TCI state operation for multi-point transmission in accordance with aspects of the present disclosure.

FIG. 8 illustrates an example of a process flow 800 that supports TCI state operation for multi-point transmission in accordance with aspects of the present disclosure. The process flow 800 may illustrate an example TCI operation for single-cell broadcast in FR2. For example, base station 105-i may perform a TCI operation to transmit signals to UE 115-ee. Base station 105-i and UE 115-ee may be examples of the corresponding wireless devices described with reference to FIGS. 1 through 7. In some cases, instead of base station 105-i implementing the TCI operation, a different type of wireless device (e.g., a UE 115) may perform the TCI operation. Alternative examples of the following may be implemented, where some steps are performed in a different order than described or are not performed at all. In some cases, steps may include additional features not mentioned below, or further steps may be added.

At 805, base station 105-i may transmit a radio resource control (RRC) message to UE 115-ee. The RRC may configure candidate TCI states. For example, up-to M candidate TCI states may be configured via RRC (e.g., M may equal 64 or 128).

At 810, base station 105-i may transmit a MAC control element to UE 115-ee. The MAC control element may activate TCI states. For example, up-to $L=2^N$ TCI states out of the M candidate TCI states from 805 may be activated via the MAC control element (e.g., L may equal 8 if N equals 3). In some cases, UE 115-ee may receive at least one MAC control element that indicates the first active TCI state set, the second active TCI state set, or both.

At 815, base station 105-i may transmit a DCI to UE 115-ee. The DCI may indicate one or more TCI states. For example, one TCI state out of L TCI states may be indicated via DCI (e.g., using N (=3)-bit TCI parameter). In some implementations, the DCI may be included in a PDCCH transmission. In some cases, UE 115-ee may receive DCI that indicates a set of resource allocations within each of which a multi-point data transmission may be scheduled for transmission. The DCI may indicate a respective TCI state from a set of TCI states assigned to each resource allocation of the set of resource allocations. In some cases, the DCI may be scrambled with a group identifier (e.g., G-RNTI), or an individual UE 115 identifier (e.g., C-RNTI). In some implementations, the DCI may indicate that the set of resource allocations are a set of TDM resource allocations that may be a set of slots or a set of symbols periods as described in FIGS. 5A and 5B. In some implementations, the DCI may indicate the set of resource allocations are a set of FDM resource allocations as described in FIG. 5C.

Upon receiving DCI, UE 115-ee may decode the DCI that is descrambled from a received bit sequence based on a group identifier assigned to a group that includes UE 115-ee. In some cases, UE 115-ee may receive second DCI and may decode the second DCI that is descrambled from a received bit sequence based on a UE identifier of UE 115-ee, the second DCI may indicate a second resource allocation for a unicast data transmission.

Based on decoding the DCI, UE 115-e may select the first TCI state from the first active TCI state set based on indexing the first active TCI state set using an index derived from the DCI. Based on decoding the second DCI, the UE 115-ee may select a second TCI state from the second active TCI state set based on indexing the second active TCI state set using an index derived from the second DCI.

At 820, UE 115-ee may monitor for a PDSCH transmission from base station 105-i. In some cases, UE 115-ee may monitor a first resource allocation of the set of resource allocations for the multi-point data transmission (e.g., PDSCH) using a receive beam corresponding to a first TCI state of the set of TCI states that are assigned to the first resource allocation. In some implementations, UE 115-e may monitor for a broadcast, multi-cast, or unicast data transmission.

At 825, base station 105-i may transmit a PDSCH transmission to UE 115-ee. In some cases, base station 105-i may transmit the multi-point data transmission (e.g., PDSCH) in each resource allocation of the set of resource allocations in accordance with a respective TCI state of the set of TCI states that are respectively assigned to the set of resource allocations. In some cases, the multi-point data transmission may be a broadcast, multi-cast, or unicast data transmission.

At 830, UE 115-*ee* may optionally transmit a positive acknowledgement (ACK) to base station 105-*e*. The ACK may indicate that UE 115-*ee* successfully received the PDSCH. In some cases, the UE 115-*ee* may transmit an ACK upon successfully decoding a unicast PDSCH transmission as described in FIG. 7.

Figure 9:
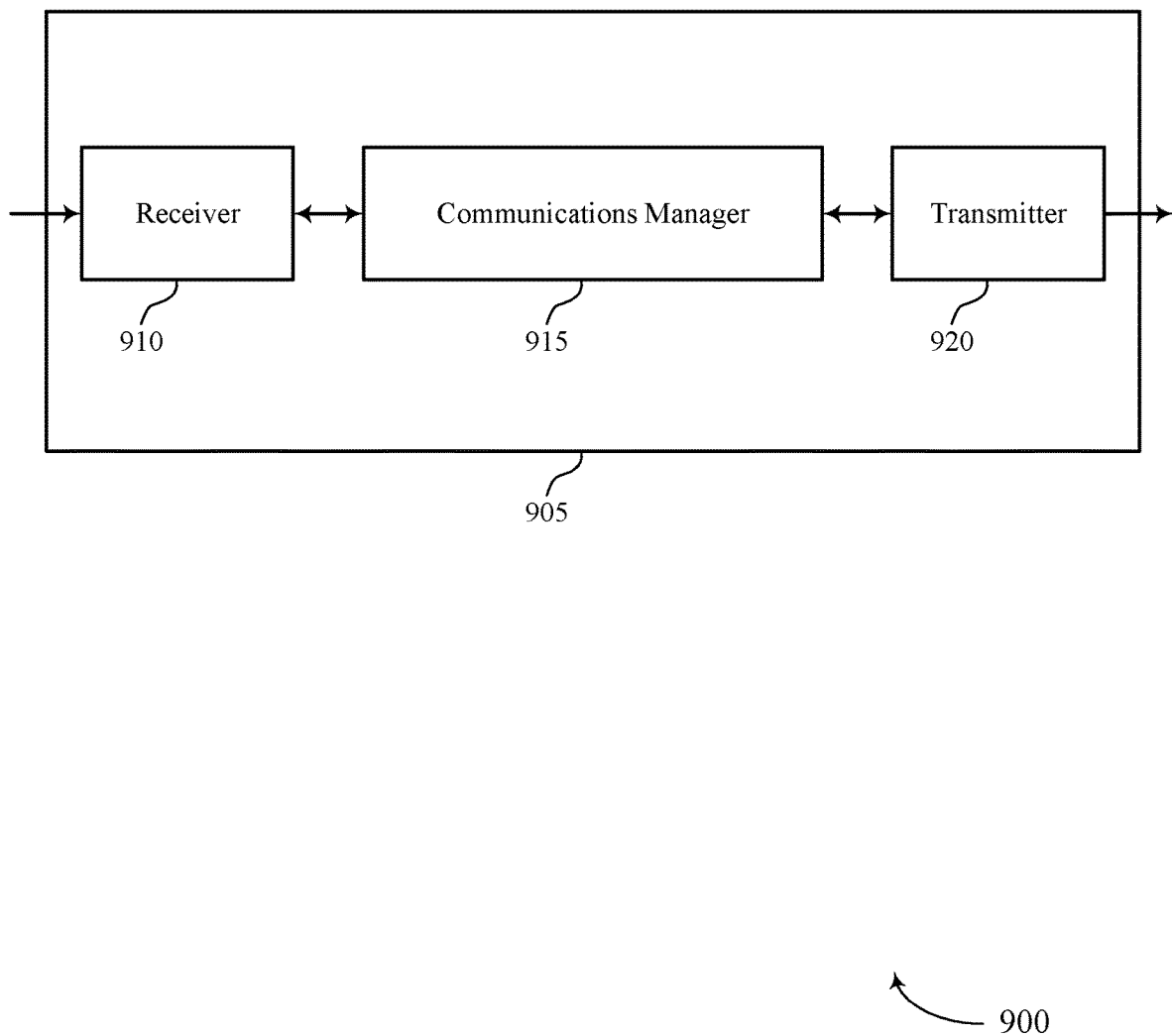
FIGS. 9 and 10 show diagrams of devices that support TCI state operation for multi-point transmission in accordance with aspects of the present disclosure.

FIG. 9 shows a diagram 900 of a device 905 that supports TCI state operation for multi-point transmission in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to TCI state operation for multi-point transmission, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive DCI that indicates a set of resource allocations within each of which a multi-point data transmission is scheduled for transmission and a respective TCI state from a set of TCI states assigned to each resource allocation of the set of resource allocations and monitor a first resource allocation of the set of resource allocations for the multi-point data transmission using a receive beam corresponding to a first TCI state of the set of TCI states that is assigned to the first resource allocation. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

The communications manager 915 as described herein may be implemented to realize one or more potential advantages. One implementation may allow the device 905 to more flexibly coordinate data transmission resource allocations between a base station and the device 905, and more specifically to coordinate resource allocations for data transmissions using TCI state indices indicated in DCI. For example, the device 905 may identify resource allocations to monitor a downlink data transmission based on received DCI that indicates resource allocations and TCI state indices.

Based on implementing the resource allocation and TCI state techniques as described herein, a processor of a UE 115 (e.g., controlling the receiver 910, the transmitter 920, or the transceiver 1220 as described with reference to FIG. 12) may increase flexibility and reliability and decrease signaling overhead in the communication of resource allocations and TCI states because one control channel transmission may be used to indicate multiple resource allocations for a data transmission.

Figure 10:
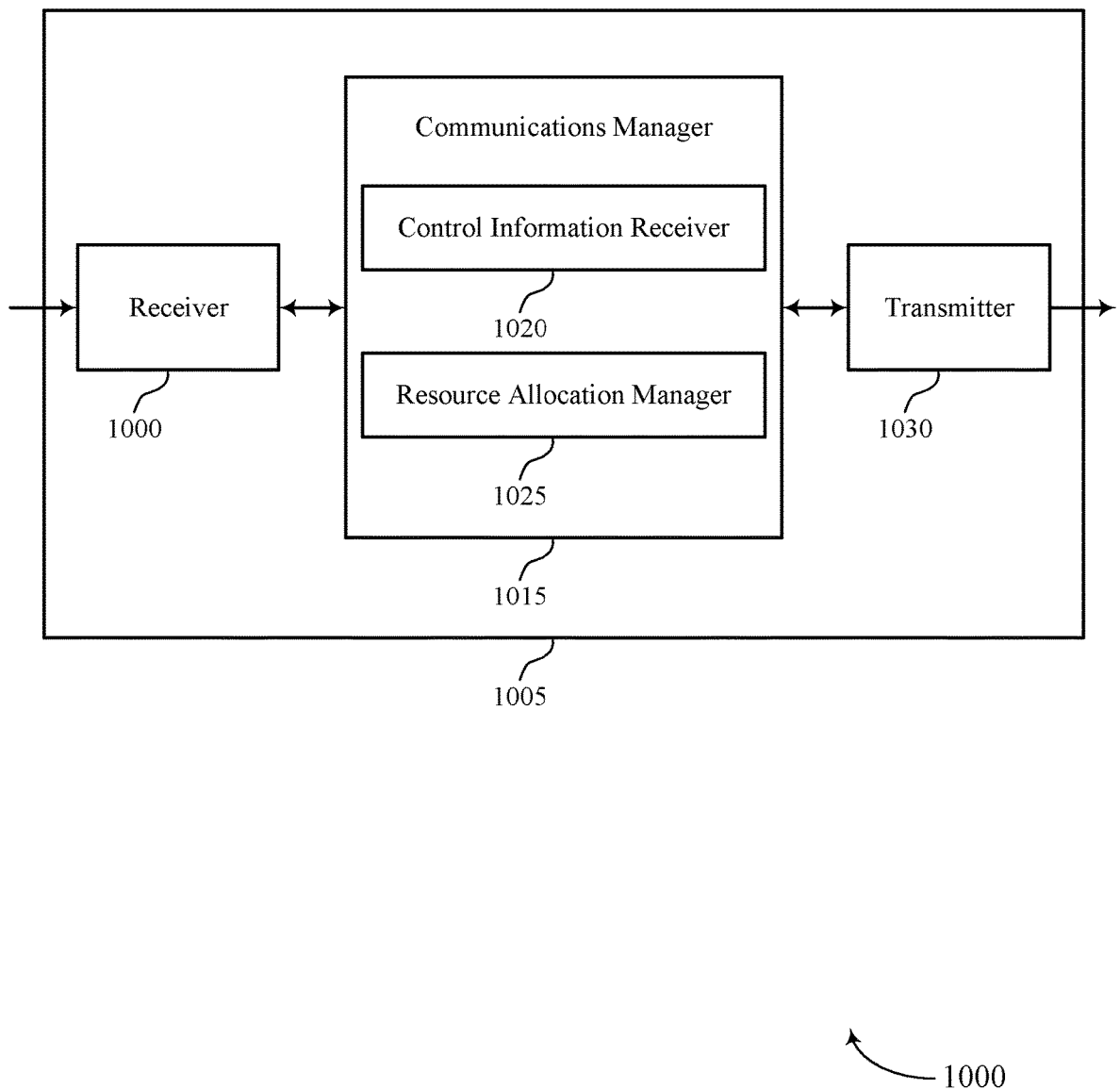

FIG. 10 shows a diagram 1000 of a device 1005 that supports TCI state operation for multi-point transmission in accordance with aspects of the present disclosure. The device 1005 may be an example of aspects of a device 905, or a UE 115 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to TCI state operation for multi-point transmission, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a control information receiver 1020 and a resource allocation manager 1025. The communications manager 1015 may be an example of aspects of the communications manager 1210 described herein.

The control information receiver 1020 may receive DCI that indicates a set of resource allocations within each of which a multi-point data transmission is scheduled for transmission and a respective TCI state from a set of TCI states assigned to each resource allocation of the set of resource allocations.

The resource allocation manager 1025 may monitor a first resource allocation of the set of resource allocations for the multi-point data transmission using a receive beam corresponding to a first TCI state of the set of TCI states that is assigned to the first resource allocation.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
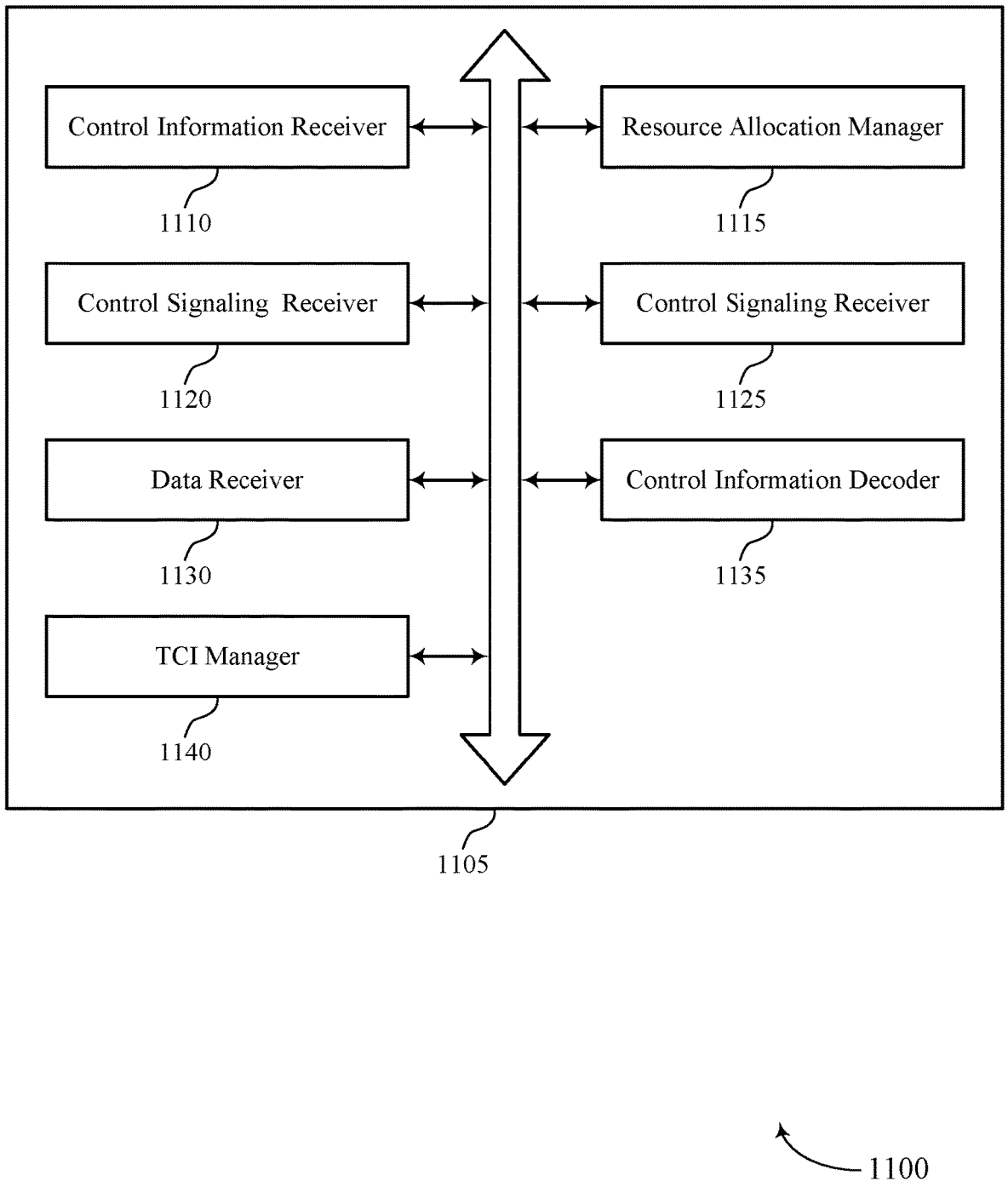
FIG. 11 shows a diagram of a communications manager that supports TCI state operation for multi-point transmission in accordance with aspects of the present disclosure.

FIG. 11 shows a diagram 1100 of a communications manager 1105 that supports TCI state operation for multi-point transmission in accordance with aspects of the present disclosure. The communications manager 1105 may be an example of aspects of a communications manager 915, a communications manager 1015, or a communications manager 1210 described herein. The communications manager 1105 may include a control information receiver 1110, a resource allocation manager 1115, a control signaling receiver 1120, a control signaling receiver 1125, a data receiver 1130, a control information decoder 1135, and a TCI manager 1140. Each of these modules may communicate, directly or indirectly, with one another (e.g., via one or more buses).

The control information receiver 1110 may receive DCI that indicates a set of resource allocations within each of which a multi-point data transmission is scheduled for transmission and a respective TCI state from a set of TCI states assigned to each resource allocation of the set of resource allocations.

In some examples, the control information receiver 1110 may receive the DCI that is scrambled with a group identifier of a group that includes the UE. In some examples, the control information receiver 1110 may receive the DCI that indicates the set of resource allocations are a set of TDM resource allocations. In some examples, the control information receiver 1110 may receive the DCI that indicates the set of TDM resource allocations are a set of slots or a set of symbol periods. In some examples, the control information receiver 1110 may receive the DCI that indicates the set of resource allocations are a set of FDM resource allocations.

The resource allocation manager 1115 may monitor a first resource allocation of the set of resource allocations for the multi-point data transmission using a receive beam corresponding to a first TCI state of the set of TCI states that is assigned to the first resource allocation. In some examples, the resource allocation manager 1115 may monitor the second resource allocation for the unicast data transmission using a second receive beam corresponding to the second TCI state. In some examples, the resource allocation manager 1115 may receive the unicast data transmission via the second resource allocation using the second receive beam. In some examples, the resource allocation manager 1115 may receive at least one MAC control element that indicates the first active TCI state set, the second active TCI state set, or both.

The control signaling receiver 1120 may receive control signaling that indicates a control channel TCI state for a first transmission beam having a first beam width that is utilized to transmit the DCI within a control channel, where the DCI is received within the control channel in accordance with the control channel TCI state.

The control signaling receiver 1125 may receive control signaling that indicates a first active TCI state set for multi-point data transmissions and a second active TCI state set for unicast data transmissions.

In some cases, the first beam width of a control channel transmission beam indicated by the control channel TCI state is different than a second beam width of a second transmission beam indicated by the first TCI state. In some cases, the control channel TCI state corresponds to a first quasi co-location relationship with a first reference signal and the first TCI state corresponds to a second quasi co-location relationship with a second reference signal. In some cases, the first quasi co-location relationship differs from the second quasi co-location relationship.

The data receiver 1130 may receive the multi-point data transmission using the receive beam. In some cases, the multi-point data transmission is a broadcast transmission or a multicast transmission. The control information decoder 1135 may decode the DCI that is descrambled from a received bit sequence based on a group identifier assigned to a group that includes the UE. In some examples, the control information decoder 1135 may decode second DCI that is descrambled from a received bit sequence based on a UE identifier of the UE, the second DCI indicating a second resource allocation for a unicast data transmission.

The TCI Manager 1140 may select the first TCI state from the first active TCI state set based on indexing the first active TCI state set using an index derived from the DCI. In some examples, the TCI Manager 1140 may select a second TCI state from the second active TCI state set based on indexing the second active TCI state set using an index derived from the second DCI.

Figure 12:
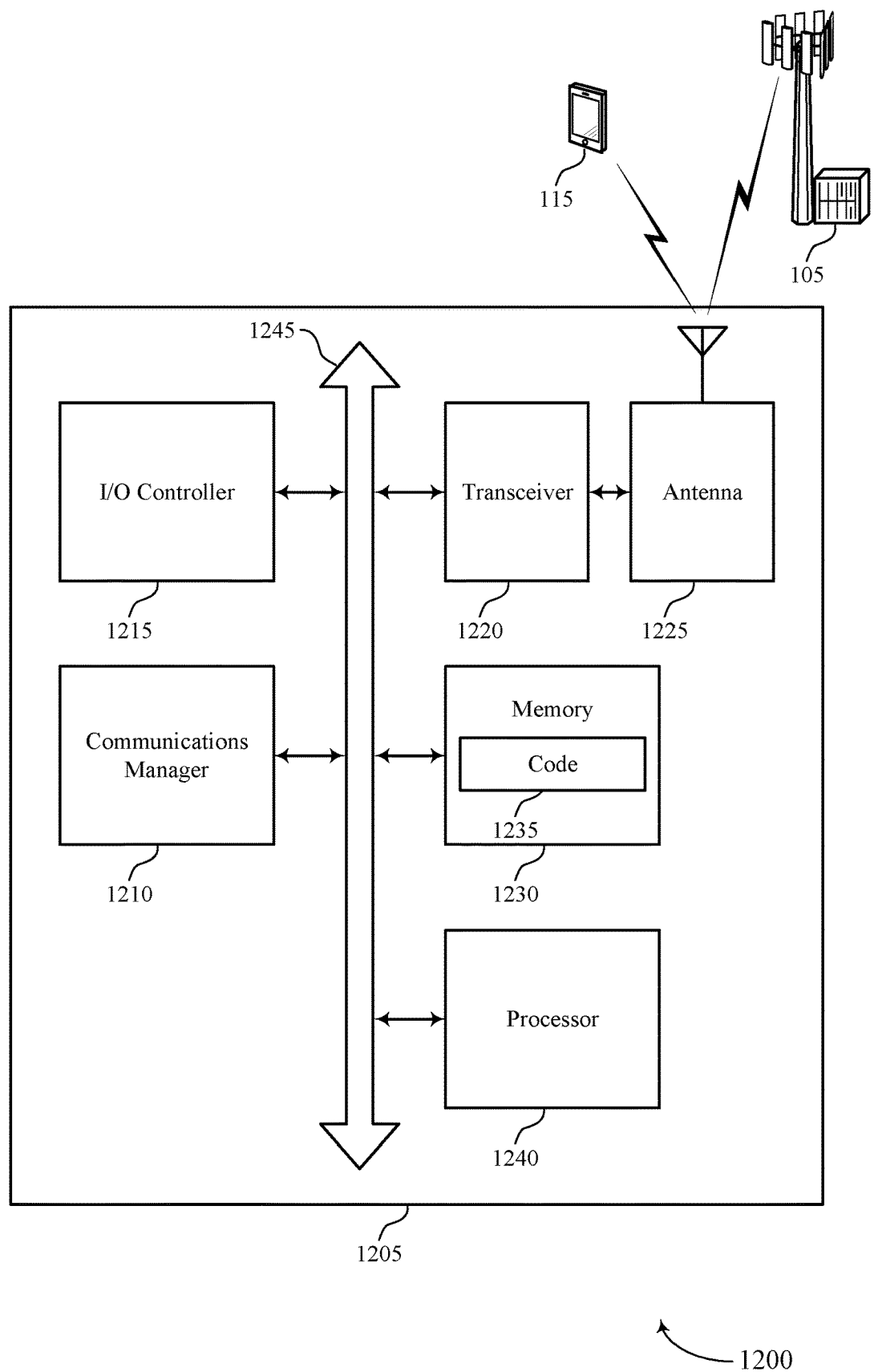
FIG. 12 shows a diagram of a system including a device that supports TCI state operation for multi-point transmission in accordance with aspects of the present disclosure.

FIG. 12 shows a diagram of a system 1200 including a device 1205 that supports TCI state operation for multi-point transmission in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive DCI that indicates a set of resource allocations within each of which a multi-point data transmission is scheduled for transmission and a respective TCI state from a set of TCI states assigned to each resource allocation of the set of resource allocations and monitor a first resource allocation of the set of resource allocations for the multi-point data transmission using a receive beam corresponding to a first TCI state of the set of TCI states that is assigned to the first resource allocation.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting TCI state operation for multi-point transmission).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
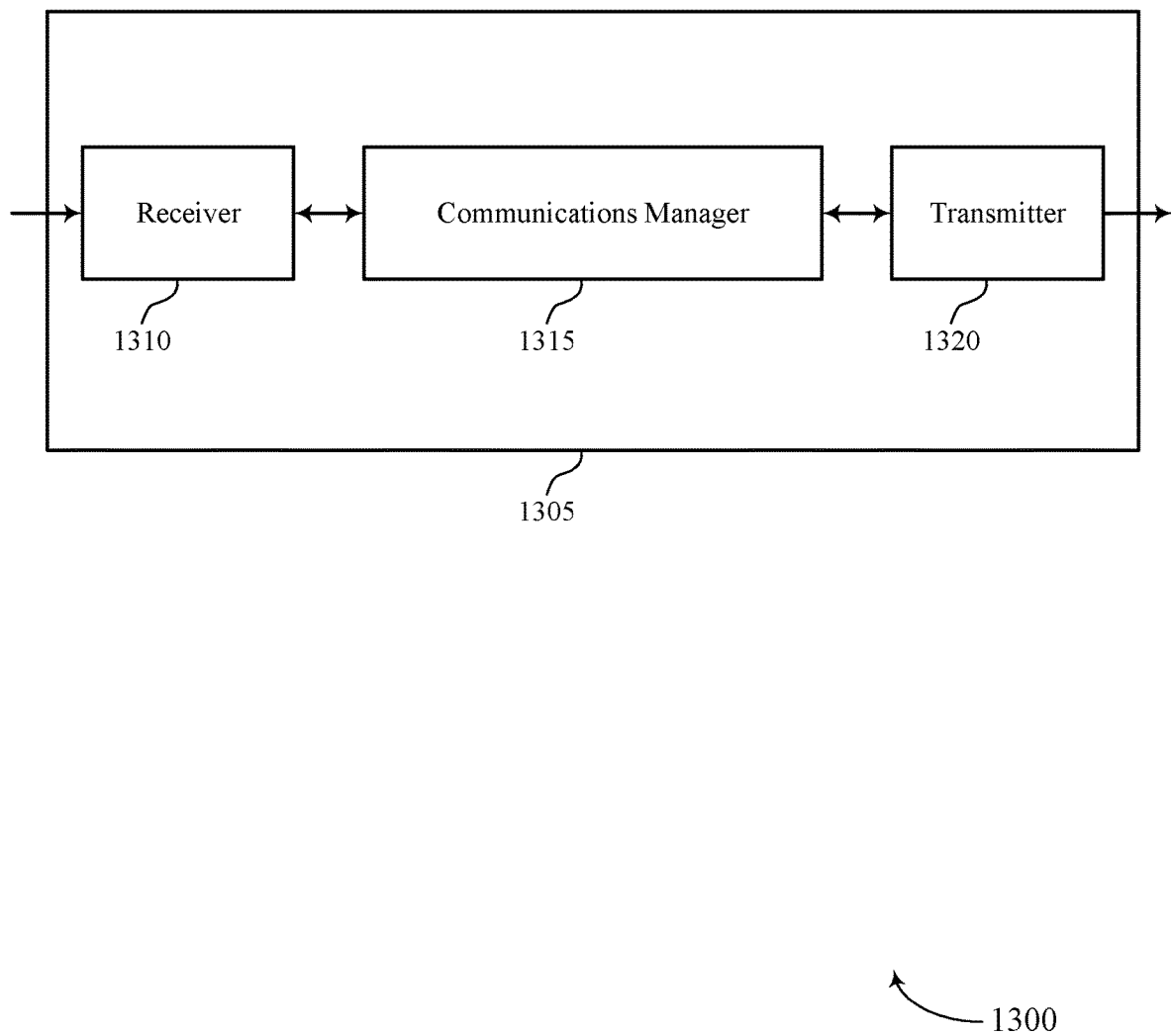
FIGS. 13 and 14 show diagrams of devices that support TCI state operation for multi-point transmission in accordance with aspects of the present disclosure.

FIG. 13 shows a diagram 1300 of a device 1305 that supports TCI state operation for multi-point transmission in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to TCI state operation for multi-point transmission, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may transmit DCI that indicates a set of resource allocations within which a multi-point data transmission is scheduled for transmission and a respective TCI state from a set of TCI states assigned to each resource allocation of the set of resource allocations and transmit the multi-point data transmission in each resource allocation of the set of resource allocations in accordance with a respective TCI state of the set of TCI states that is respectively assigned to the set of resource allocations. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
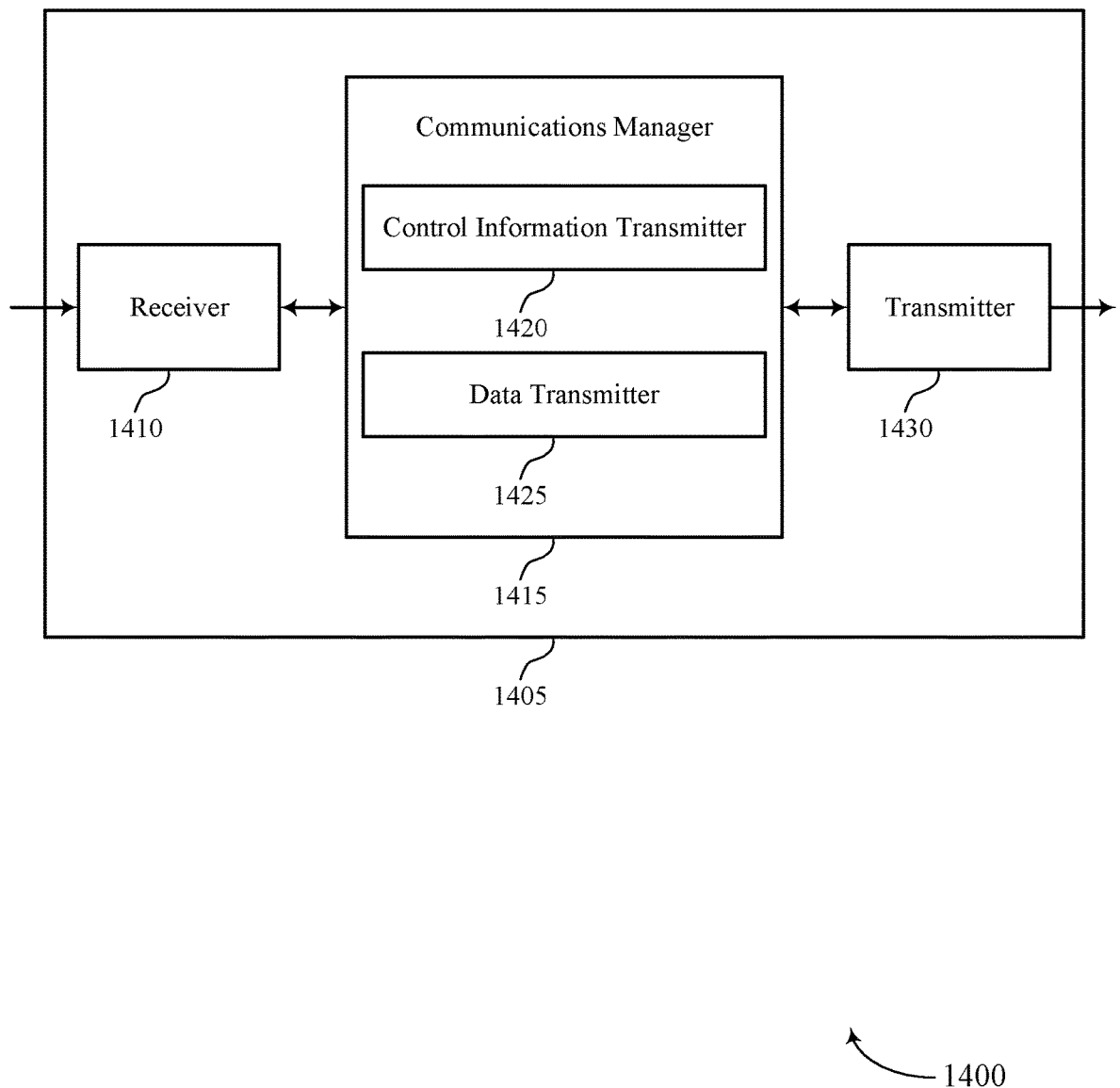

FIG. 14 shows a diagram 1400 of a device 1405 that supports TCI state operation for multi-point transmission in accordance with aspects of the present disclosure. The device 1405 may be an example of aspects of a device 1305, or a base station 105 as described herein. The device 1405 may include a receiver 1410, a communications manager 1415, and a transmitter 1430. The device 1405 may also include a processor. Each of these components may be in communication with one another (e.g., via one or more buses).

The receiver 1410 may receive information such as packets, user data, or control information associated with various information channels (e.g., control channels, data channels, and information related to TCI state operation for multi-point transmission, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a control information transmitter 1420 and a data transmitter 1425. The communications manager 1415 may be an example of aspects of the communications manager 1610 described herein.

The control information transmitter 1420 may transmit DCI that indicates a set of resource allocations within which a multi-point data transmission is scheduled for transmission and a respective TCI state from a set of TCI states assigned to each resource allocation of the set of resource allocations.

The data transmitter 1425 may transmit the multi-point data transmission in each resource allocation of the set of resource allocations in accordance with a respective TCI state of the set of TCI states that is respectively assigned to the set of resource allocations.

The transmitter 1430 may transmit signals generated by other components of the device 1405. In some examples, the transmitter 1430 may be collocated with a receiver 1410 in a transceiver module. For example, the transmitter 1430 may be an example of aspects of the transceiver 1620 described with reference to FIG. 16. The transmitter 1430 may utilize a single antenna or a set of antennas.

Figure 15:
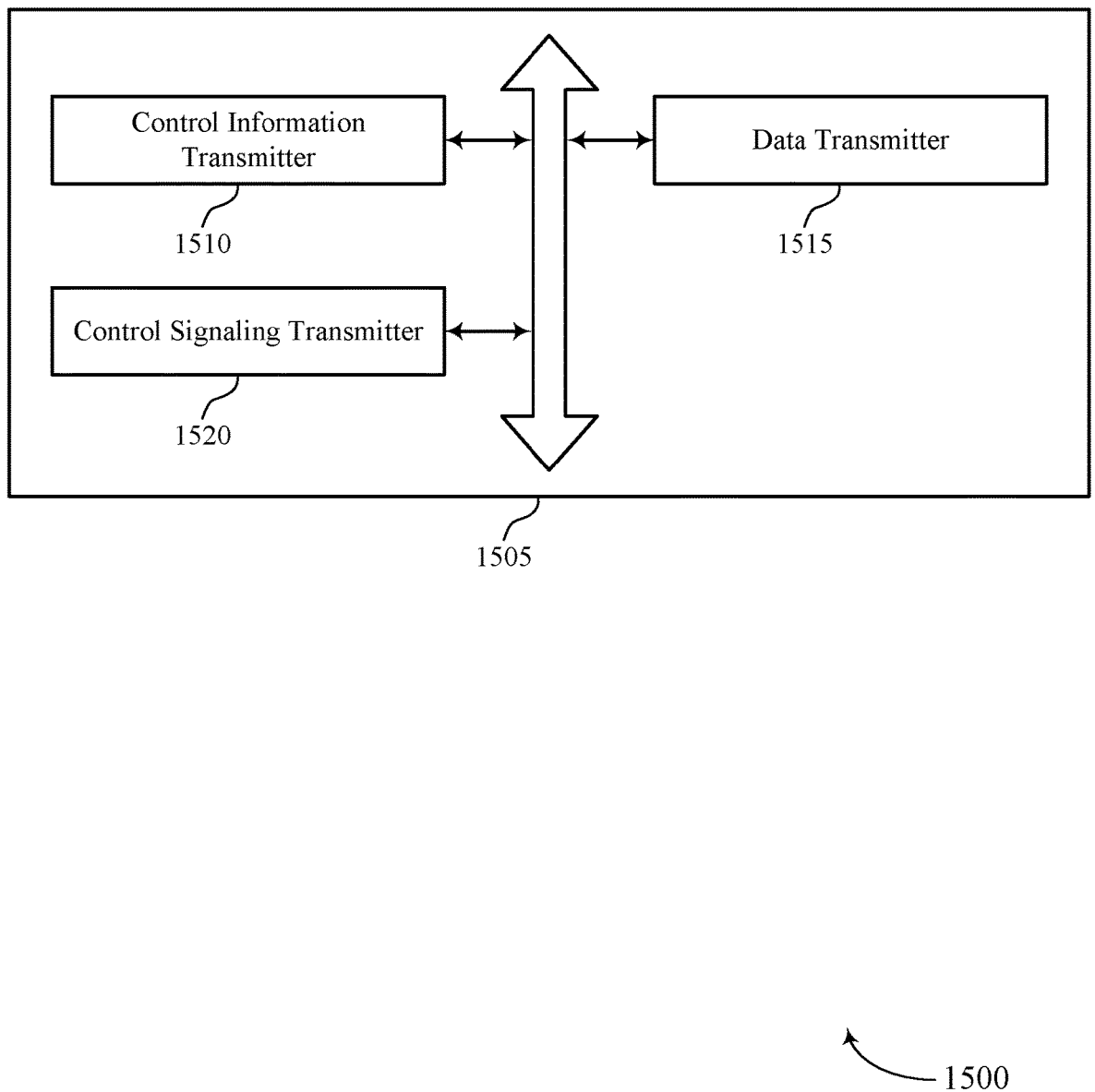
FIG. 15 shows a diagram of a communications manager that supports TCI state operation for multi-point transmission in accordance with aspects of the present disclosure.

FIG. 15 shows a diagram 1500 of a communications manager 1505 that supports TCI state operation for multi-point transmission in accordance with aspects of the present disclosure. The communications manager 1505 may be an example of aspects of a communications manager 1315, a communications manager 1415, or a communications manager 1610 described herein. The communications manager 1505 may include a control information transmitter 1510, a data transmitter 1515, and a control signaling transmitter 1520. Each of these modules may communicate, directly or indirectly, with one another (e.g., via one or more buses).

The control information transmitter 1510 may transmit DCI that indicates a set of resource allocations within which a multi-point data transmission is scheduled for transmission and a respective TCI state from a set of TCI states assigned to each resource allocation of the set of resource allocations.

In some examples, the control information transmitter 1510 may transmit the DCI that is scrambled with a group identifier of a group of UEs. In some examples, the control information transmitter 1510 may transmit the DCI that indicates the set of resource allocations are a set of TDM resource allocations.

In some examples, the control information transmitter 1510 may transmit the DCI that indicates the set of TDM resource allocations are a set of slots or a set of symbol periods. In some examples, the control information transmitter 1510 may transmit the DCI that indicates the set of resource allocations are a set of FDM resource allocations.

In some examples, the control information transmitter 1510 may transmit second DCI indicating a second resource allocation for a unicast data transmission and an index to a second TCI state within the second active TCI state set. In some examples, the control information transmitter 1510 may transmit at least one MAC control element that indicates the first active TCI state set, the second active TCI state set, or both.

The data transmitter 1515 may transmit the multi-point data transmission in each resource allocation of the set of resource allocations in accordance with a respective TCI state of the set of TCI states that is respectively assigned to the set of resource allocations. In some examples, the data transmitter 1515 may transmit the unicast data transmission via the second resource allocation in accordance with the second TCI state. In some cases, the multi-point data transmission is a broadcast transmission or a multicast transmission.

The control signaling transmitter 1520 may transmit control signaling that indicates a control channel TCI state for a first transmission beam having a first beam width that is utilized to transmit the DCI within a control channel, where the DCI is transmitted within the control channel in accordance with the control channel TCI state. In some examples, the control signaling transmitter 1520 may transmit control signaling that indicates a first active TCI state set for multi-point data transmissions and a second active TCI state set for unicast data transmissions.

In some cases, the first beam width of a control channel transmission beam indicated by the control channel TCI state is wider than a second beam width of a second transmission beam indicated by a first TCI state of the plurality of transmission configuration indicator states. In some cases, the control channel TCI state corresponds to a first quasi co-location relationship with a first reference signal and a first TCI state of the plurality of transmission configuration indicator states corresponds to a second quasi co-location relationship with a second reference signal. In some cases, the first quasi co-location relationship differs from the second quasi co-location relationship.

Figure 16:
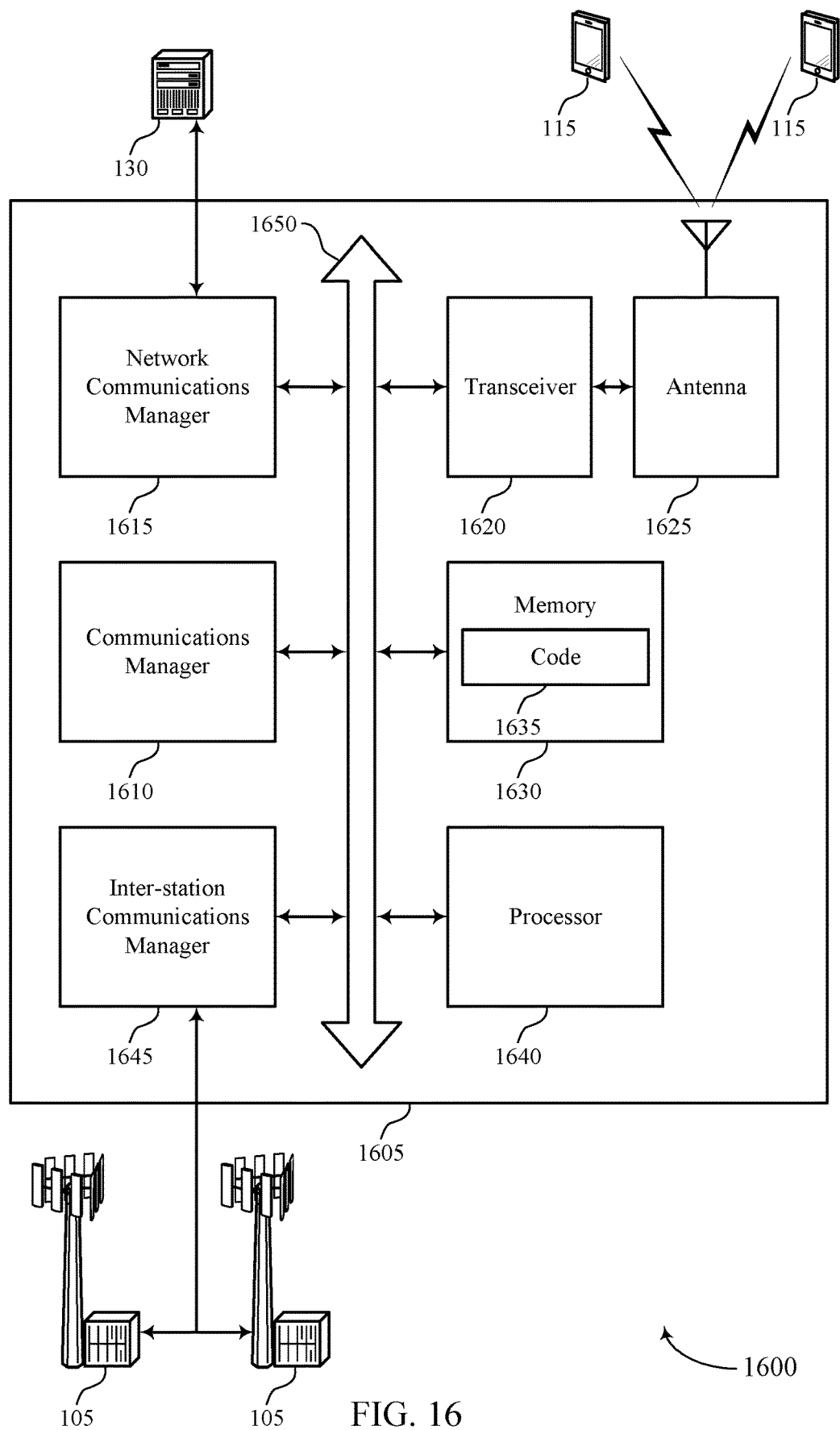
FIG. 16 shows a diagram of a system including a device that supports TCI state operation for multi-point transmission in accordance with aspects of the present disclosure.

FIG. 16 shows a diagram of a system 1600 including a device 1605 that supports TCI state operation for multi-point transmission in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may transmit DCI that indicates a set of resource allocations within which a multi-point data transmission is scheduled for transmission and a respective TCI state from a set of TCI states assigned to each resource allocation of the set of resource allocations and transmit the multi-point data transmission in each resource allocation of the set of resource allocations in accordance with a respective TCI state of the set of TCI states that is respectively assigned to the set of resource allocations.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting TCI state operation for multi-point transmission).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
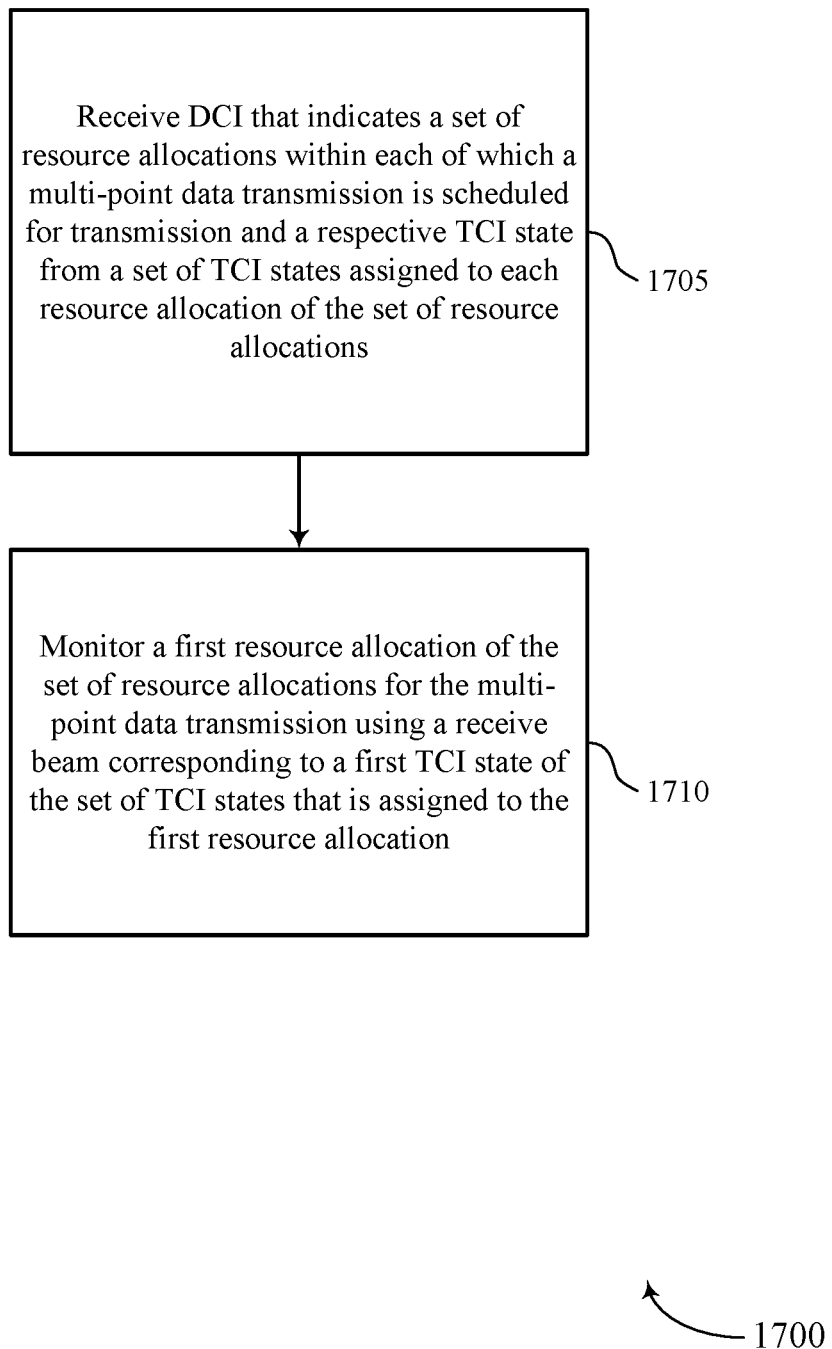
FIGS. 17 through 20 show flowcharts illustrating methods that support TCI state operation for multi-point transmission in accordance with aspects of the present disclosure.

FIG. 17 shows a flowchart illustrating a method 1700 that supports TCI state operation for multi-point transmission in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive DCI that indicates a set of resource allocations within each of which a multi-point data transmission is scheduled for transmission and a respective TCI state from a set of TCI states assigned to each resource allocation of the set of resource allocations. The operations of 1705 may be performed according to the methods described herein. In some examples, aspects of the operations of 1705 may be performed by a control information receiver as described with reference to FIGS. 9 through 12.

At 1710, the UE may monitor a first resource allocation of the set of resource allocations for the multi-point data transmission using a receive beam corresponding to a first TCI state of the set of TCI states that is assigned to the first resource allocation. The operations of 1710 may be performed according to the methods described herein. In some examples, aspects of the operations of 1710 may be performed by a resource allocation manager as described with reference to FIGS. 9 through 12.

Figure 18:
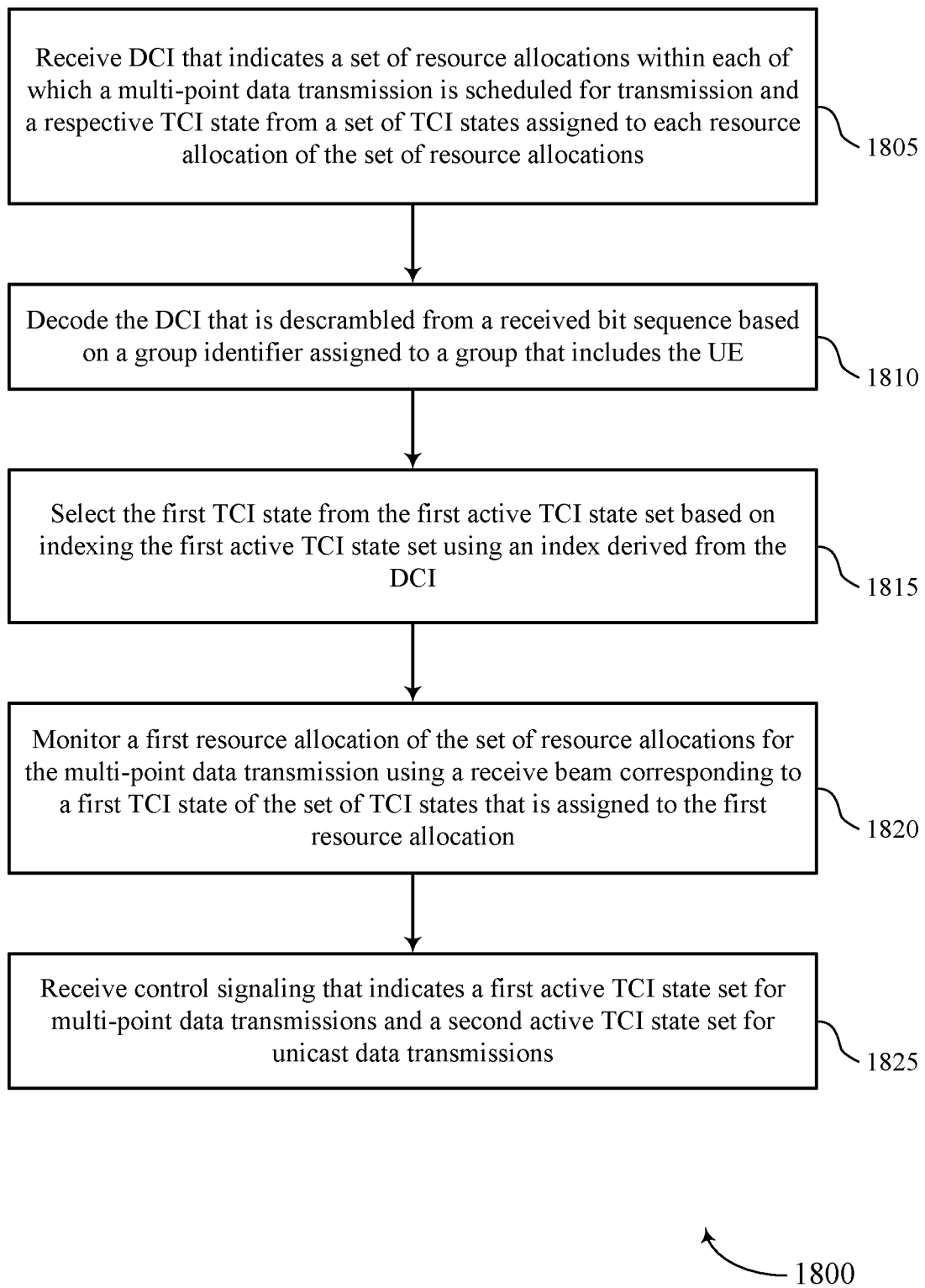

FIG. 18 shows a flowchart illustrating a method 1800 that supports TCI state operation for multi-point transmission in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive DCI that indicates a set of resource allocations within each of which a multi-point data transmission is scheduled for transmission and a respective TCI state from a set of TCI states assigned to each resource allocation of the set of resource allocations. The operations of 1805 may be performed according to the methods described herein. In some examples, aspects of the operations of 1805 may be performed by a control information receiver as described with reference to FIGS. 9 through 12.

At 1810, the UE may decode the DCI that is descrambled from a received bit sequence based on a group identifier assigned to a group that includes the UE. The operations of 1810 may be performed according to the methods described herein. In some examples, aspects of the operations of 1810 may be performed by a control information decoder as described with reference to FIGS. 9 through 12.

At 1815, the UE may select the first TCI state from the first active TCI state set based on indexing the first active TCI state set using an index derived from the DCI. The operations of 1815 may be performed according to the methods described herein. In some examples, aspects of the operations of 1815 may be performed by a TCI Manager as described with reference to FIGS. 9 through 12.

At 1820, the UE may monitor a first resource allocation of the set of resource allocations for the multi-point data transmission using a receive beam corresponding to a first TCI state of the set of TCI states that is assigned to the first resource allocation. The operations of 1820 may be performed according to the methods described herein. In some examples, aspects of the operations of 1820 may be performed by a resource allocation manager as described with reference to FIGS. 9 through 12.

At 1825, the UE may receive control signaling that indicates a first active TCI state set for multi-point data transmissions and a second active TCI state set for unicast data transmissions. The operations of 1825 may be performed according to the methods described herein. In some examples, aspects of the operations of 1825 may be performed by a control signaling receiver as described with reference to FIGS. 9 through 12.

Figure 19:
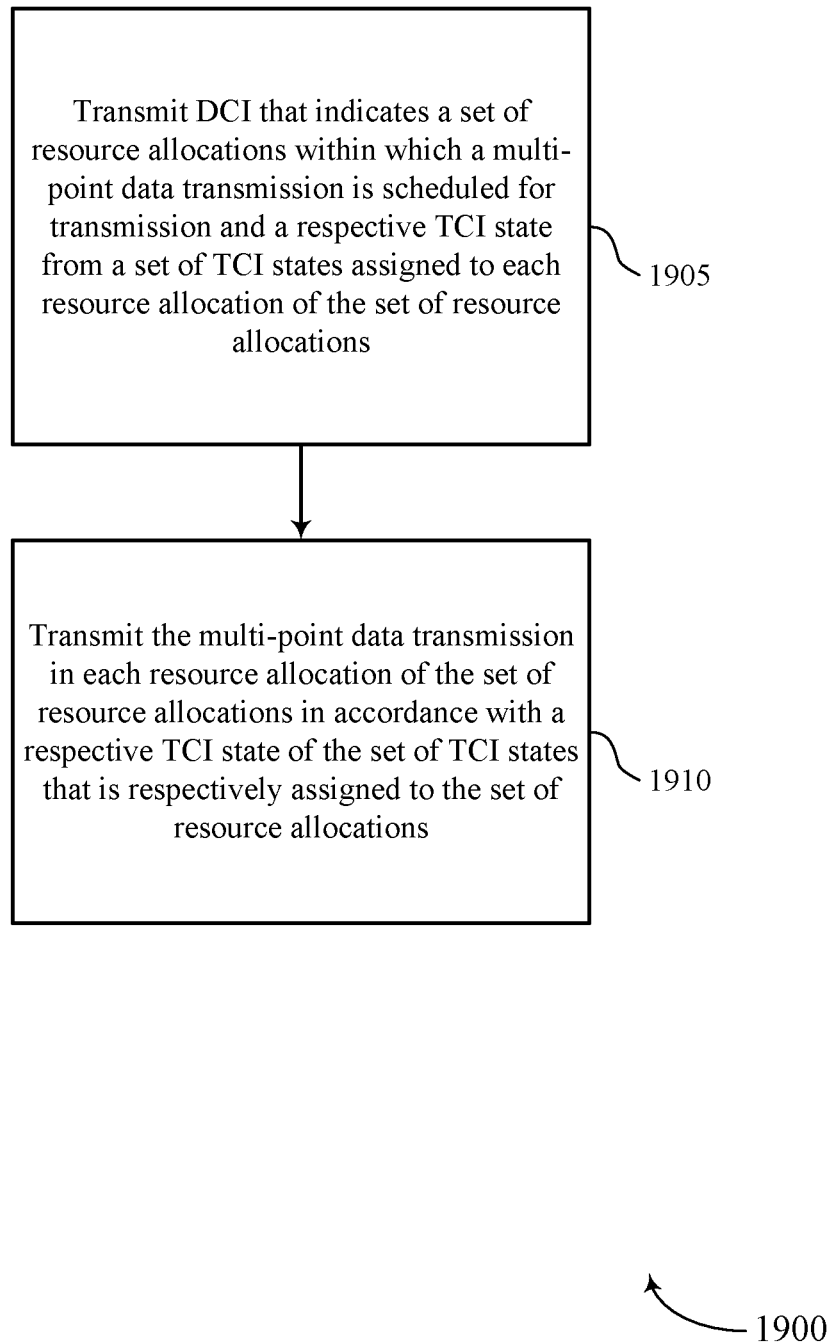

FIG. 19 shows a flowchart illustrating a method 1900 that supports TCI state operation for multi-point transmission in accordance with aspects of the present disclosure. The operations of method 1900 may be implemented by a base station 105 or its components as described herein. For example, the operations of method 1900 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1905, the base station may transmit DCI that indicates a set of resource allocations within which a multi-point data transmission is scheduled for transmission and a respective TCI state from a set of TCI states assigned to each resource allocation of the set of resource allocations. The operations of 1905 may be performed according to the methods described herein. In some examples, aspects of the operations of 1905 may be performed by a control information transmitter as described with reference to FIGS. 13 through 16.

At 1910, the base station may transmit the multi-point data transmission in each resource allocation of the set of resource allocations in accordance with a respective TCI state of the set of TCI states that is respectively assigned to the set of resource allocations. The operations of 1910 may be performed according to the methods described herein. In some examples, aspects of the operations of 1910 may be performed by a data transmitter as described with reference to FIGS. 13 through 16.

Figure 20:
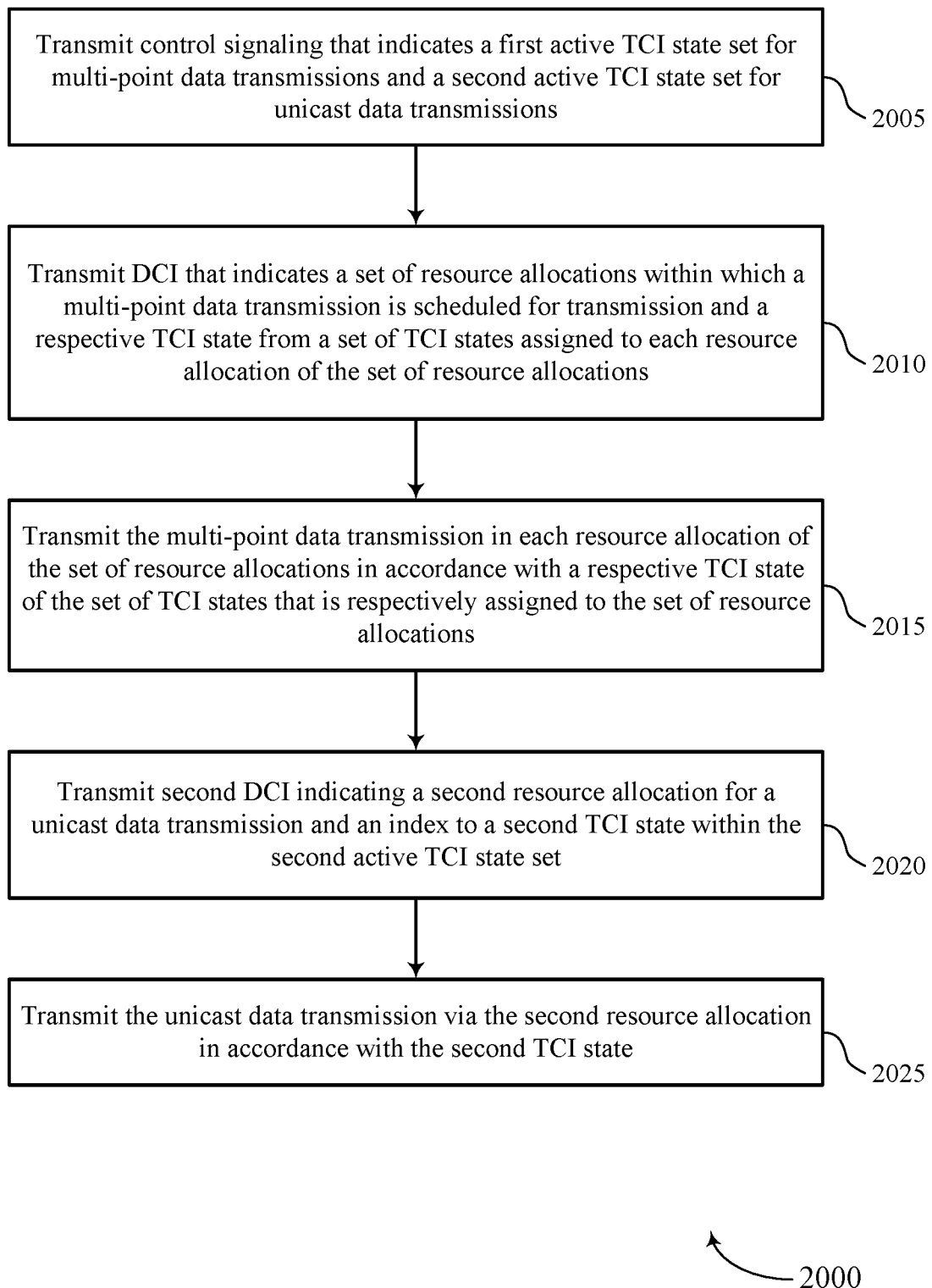

FIG. 20 shows a flowchart illustrating a method 2000 that supports TCI state operation for multi-point transmission in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may transmit control signaling that indicates a first active TCI state set for multi-point data transmissions and a second active TCI state set for unicast data transmissions. The operations of 2005 may be performed according to the methods described herein. In some examples, aspects of the operations of 2005 may be performed by a control signaling transmitter as described with reference to FIGS. 13 through 16.

At 2010, the base station may transmit DCI that indicates a set of resource allocations within which a multi-point data transmission is scheduled for transmission and a respective TCI state from a set of TCI states assigned to each resource allocation of the set of resource allocations. The operations of 2010 may be performed according to the methods described herein. In some examples, aspects of the operations of 2010 may be performed by a control information transmitter as described with reference to FIGS. 13 through 16.

At 2015, the base station may transmit the multi-point data transmission in each resource allocation of the set of resource allocations in accordance with a respective TCI state of the set of TCI states that is respectively assigned to the set of resource allocations. The operations of 2015 may be performed according to the methods described herein. In some examples, aspects of the operations of 2015 may be performed by a data transmitter as described with reference to FIGS. 13 through 16.

At 2020, the base station may transmit second DCI indicating a second resource allocation for a unicast data transmission and an index to a second TCI state within the second active TCI state set. The operations of 2020 may be performed according to the methods described herein. In some examples, aspects of the operations of 2020 may be performed by a control information transmitter as described with reference to FIGS. 13 through 16.

At 2025, the base station may transmit the unicast data transmission via the second resource allocation in accordance with the second TCI state. The operations of 2025 may be performed according to the methods described herein. In some examples, aspects of the operations of 2025 may be performed by a data transmitter as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    receiving downlink control information that indicates a plurality of resource allocations, wherein a multi-point data transmission is scheduled for transmission within each resource allocation of the plurality of resource allocations, and a respective transmission configuration indicator state from a plurality of transmission configuration indicator states is assigned to each resource allocation of the plurality of resource allocations; and
    monitoring a first resource allocation of the plurality of resource allocations for the multi-point data transmission using a receive beam corresponding to a first transmission configuration indicator state of the plurality of transmission configuration indicator states that is assigned to the first resource allocation.

2. The method of claim 1, wherein receiving the downlink control information comprises:
    receiving the downlink control information that is scrambled with a group identifier of a group that includes the UE.

3. The method of claim 1, wherein receiving the downlink control information comprises:
    receiving the downlink control information that indicates the plurality of resource allocations are a plurality of time domain multiplexed resource allocations.

4. The method of claim 3, wherein receiving the downlink control information comprises:
    receiving the downlink control information that indicates the plurality of time domain multiplexed resource allocations are a plurality of slots or a plurality of symbol periods.

5. The method of claim 1, wherein receiving the downlink control information comprises:
    receiving the downlink control information that indicates the plurality of resource allocations are a plurality of frequency division multiplexed resource allocations.

6. The method of claim 1, further comprising:
    receiving control signaling that indicates a control channel transmission configuration indicator state for a first transmission beam having a first beam width that is utilized to transmit the downlink control information within a control channel, wherein the downlink control information is received within the control channel in accordance with the control channel transmission configuration indicator state.

7. The method of claim 6, wherein the first beam width of a control channel transmission beam indicated by the control channel transmission configuration indicator state is different than a second beam width of a second transmission beam indicated by the first transmission configuration indicator state.

8. The method of claim 6, wherein the control channel transmission configuration indicator state corresponds to a first quasi co-location relationship with a first reference signal and the first transmission configuration indicator state corresponds to a second quasi co-location relationship with a second reference signal.

9. The method of claim 8, wherein the first quasi co-location relationship differs from the second quasi co-location relationship.

10. The method of claim 1, further comprising:
receiving the multi-point data transmission using the receive beam.

11. The method of claim 10, wherein the multi-point data transmission is a broadcast transmission or a multicast transmission.

12. The method of claim 1, further comprising:
receiving control signaling that indicates a first active transmission configuration indicator state set for multi-point data transmissions and a second active transmission configuration indicator state set for unicast data transmissions.

13. The method of claim 12, further comprising:
decoding the downlink control information that is descrambled from a received bit sequence based at least in part on a group identifier assigned to a group that includes the UE; and
selecting the first transmission configuration indicator state from the first active transmission configuration indicator state set based at least in part on indexing the first active transmission configuration indicator state set using an index derived from the downlink control information.

14. The method of claim 12, further comprising:
decoding second downlink control information that is descrambled from a received bit sequence based at least in part on a UE identifier of the UE, the second downlink control information indicating a second resource allocation for a unicast data transmission;
selecting a second transmission configuration indicator state from the second active transmission configuration indicator state set based at least in part on indexing the second active transmission configuration indicator state set using an index derived from the second downlink control information; and
monitoring the second resource allocation for the unicast data transmission using a second receive beam corresponding to the second transmission configuration indicator state.

15. The method of claim 14, wherein monitoring the second resource allocation comprises:
receiving the unicast data transmission via the second resource allocation using the second receive beam.

16. The method of claim 12, wherein receiving the control signaling comprises:
receiving at least one medium access control (MAC) control element that indicates the first active transmission configuration indicator state set, the second active transmission configuration indicator state set, or both.

17. A method for wireless communications by a network device, comprising:
transmitting downlink control information that indicates a plurality of resource allocations, wherein a multi-point data transmission is scheduled for transmission within each resource allocation of the plurality of resource allocations, and a respective transmission configuration indicator state from a plurality of transmission configuration indicator states is assigned to each resource allocation of the plurality of resource allocations; and
transmitting the multi-point data transmission in each resource allocation of the plurality of resource allocations in accordance with a respective transmission configuration indicator state of the plurality of transmission configuration indicator states that is respectively assigned to the plurality of resource allocations.

18. The method of claim 17, wherein transmitting the downlink control information comprises:
transmitting the downlink control information that is scrambled with a group identifier of a group of user equipments.

19. The method of claim 17, wherein transmitting the downlink control information comprises:
transmitting the downlink control information that indicates the plurality of resource allocations are a plurality of time domain multiplexed resource allocations.

20. The method of claim 19, wherein transmitting the downlink control information comprises:
transmitting the downlink control information that indicates the plurality of time domain multiplexed resource allocations are a plurality of slots or a plurality of symbol periods.

21. The method of claim 17, wherein transmitting the downlink control information comprises:
transmitting the downlink control information that indicates the plurality of resource allocations are a plurality of frequency division multiplexed resource allocations.

22. The method of claim 17, further comprising:
transmitting control signaling that indicates a control channel transmission configuration indicator state for a first transmission beam having a first beam width that is utilized to transmit the downlink control information within a control channel, wherein the downlink control information is transmitted within the control channel in accordance with the control channel transmission configuration indicator state.

23. The method of claim 22, wherein the first beam width of a control channel transmission beam indicated by the control channel transmission configuration indicator state is wider than a second beam width of a second transmission beam indicated by a first transmission configuration indicator state of the plurality of transmission configuration indicator states.

24. The method of claim 22, wherein the control channel transmission configuration indicator state corresponds to a first quasi co-location relationship with a first reference signal and a first transmission configuration indicator state of the plurality of transmission configuration indicator states corresponds to a second quasi co-location relationship with a second reference signal.

25. The method of claim 17, wherein the multi-point data transmission is a broadcast transmission or a multicast transmission.

26. The method of claim 17, further comprising:
transmitting control signaling that indicates a first active transmission configuration indicator state set for multi-point data transmissions and a second active transmission configuration indicator state set for unicast data transmissions.

27. The method of claim 26, further comprising:
transmitting second downlink control information indicating a second resource allocation for a unicast data transmission and an index to a second transmission configuration indicator state within the second active transmission configuration indicator state set; and transmitting the unicast data transmission via the second resource allocation in accordance with the second transmission configuration indicator state.

28. The method of claim 26, wherein transmitting the control signaling comprises:

transmitting at least one medium access control (MAC) control element that indicates the first active transmission configuration indicator state set, the second active transmission configuration indicator state set, or both.

29. An apparatus for wireless communications by a user equipment (UE), comprising:

a processor, memory coupled with the processor; and instructions stored in the memory and executable by the processor to cause the apparatus to:

receive downlink control information that indicates a plurality of resource allocations, wherein a multi-point data transmission is scheduled for transmission within each resource allocation of the plurality of resource allocations, and a respective transmission configuration indicator state from a plurality of transmission configuration indicator states is assigned to each resource allocation of the plurality of resource allocations; and monitor a first resource allocation of the plurality of resource allocations for the multi-point data transmission using a receive beam corresponding to a first transmission configuration indicator state of the plurality of transmission configuration indicator states that is assigned to the first resource allocation.

30. An apparatus for wireless communications by a network device, comprising:

a processor, memory coupled with the processor; and instructions stored in the memory and executable by the processor to cause the apparatus to:

transmit downlink control information that indicates a plurality of resource allocations, wherein a multi-point data transmission is scheduled for transmission within each resource allocation of the plurality of resource allocations, and a respective transmission configuration indicator state from a plurality of transmission configuration indicator states is assigned to each resource allocation of the plurality of resource allocations; and transmit the multi-point data transmission in each resource allocation of the plurality of resource allocations in accordance with a respective transmission configuration indicator state of the plurality of transmission configuration indicator states that is respectively assigned to the plurality of resource allocations.

* * * * *